(12) United States Patent
Dugan et al.

(10) Patent No.: US 8,346,694 B2
(45) Date of Patent: Jan. 1, 2013

(54) METHOD AND SYSTEM FOR DYNAMIC PROBABILISTIC RISK ASSESSMENT

(75) Inventors: Joanne Bechta Dugan, Crozet, VA (US); Hong Xu, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 891 days.

(21) Appl. No.: 11/722,432

(22) PCT Filed: Dec. 21, 2005

(86) PCT No.: PCT/US2005/046643
§ 371 (c)(1),
(2), (4) Date: Jan. 15, 2010

(87) PCT Pub. No.: WO2007/086823
PCT Pub. Date: Aug. 2, 2007

(65) Prior Publication Data
US 2011/0137703 A1  Jun. 9, 2011

Related U.S. Application Data

(60) Provisional application No. 60/637,847, filed on Dec. 21, 2004, provisional application No. 60/750,001, filed on Dec. 13, 2005.

(51) Int. Cl.
*G06N 5/00* (2006.01)

(52) U.S. Cl. ............................................ 706/45; 714/26
(58) Field of Classification Search .................... 706/45; 714/26
See application file for complete search history.

(56) References Cited

OTHER PUBLICATIONS

Xu et al ("Combining Dynamic Fault Trees and Event Trees for probabilistic Risk Assessment" RAM 2004.*
Cepin et al ("A dynamic fault tree" 2002).*
Manian et al (Bridging the Gap Between Systems and Dynamic Fault Tree Models 1999).*
Dugan et al ("Developing a Low-Cost High-Quality Software Tool for Dynamic Fault-Tree Analysis" Mar. 200).*

* cited by examiner

*Primary Examiner* — Lut Wong
(74) *Attorney, Agent, or Firm* — Novak Druce DeLuca + Quigg LLP; Robert J. Decker

(57) ABSTRACT

The DEFT methodology, system and computer readable medium extends the applicability of the PRA (Probabilistic Risk Assessment) methodology to computer-based systems, by allowing DFT (Dynamic Fault Tree) nodes as pivot nodes in the Event Tree (ET) model. DEFT includes a mathematical model and solution algorithm, supports all common PRA analysis functions and cutsets. Additional capabilities enabled by the DFT include modularization, phased mission analysis, sequence dependencies, and imperfect coverage.

13 Claims, 26 Drawing Sheets

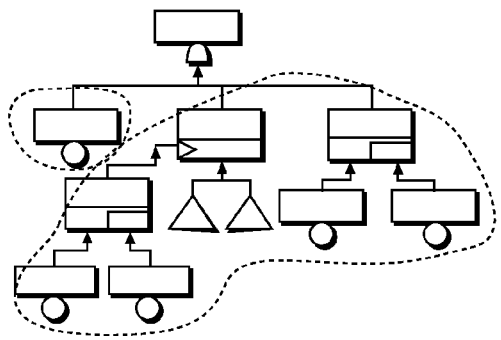
(A) FT OF SUBSYSTEM x1 --- ACCESSING BY THE CUSTOMER
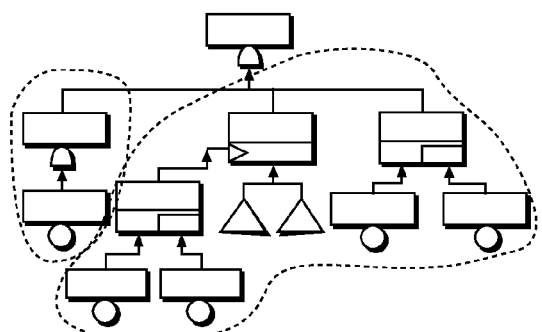
(B) FT OF SUBSYSTEM x2 --- ACCESSING BY TELLERS
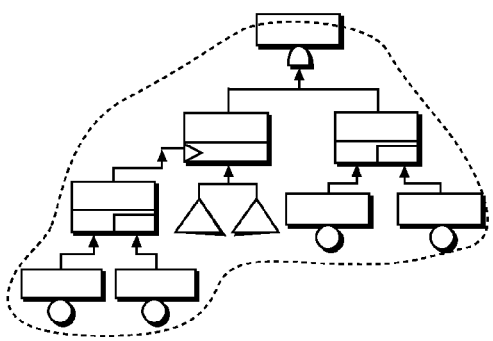
(C) FT OF SUBSYSTEM x3 --- ACCESSING BY THE SYSTEM MANAGER
*FIG. 8*

BASIC EVENTS

 BASIC EVENT: CORRESPONDS TO A BASIC FAILURE EVENT (USUALLY A COMPONENT FAILURE) IN THE SYSTEM. CHARACTERIZED BY FAILURE RATE OR FAILURE PROBABILITY

 UNDEVELOPED BASIC EVENT: A BASIC EVENT THAT IS NOT COMPLETELY DEVELOPED, USUALLY BECAUSE OF UNAVAILABLE INFORMATION.
CHARACTERIZED BY FAILURE RATE OR FAILURE PROBABILITY

 REPLICATED BASIC EVENT; REPRESENTS K STATISTICALLY IDENTICAL COPIES OF A COMPONENT
CHARACTERIZED BY FAILURE RATE OR FAILURE PROBABILITY

*FIG. 12*

STATIC FAULT TREE GATES
 AND GATE- OUTPUT EVENT OCCURS ONLY IF ALL INPUT EVENTS OCCUR
 OR GATE- OUTPUT EVENT OCCURS IF ONE OR MORE INPUT EVENT OCCURS
 M/N GATE-OUTPUT EVENT OCCURS IF M OR MORE OF THE N INPUTS OCCUR
*FIG. 13*

PROBABILISTIC ANALYSIS USING INCLUSION-EXCLUSION

PR(A) + PR(B) + PR(C)
    -PR(A AND B)-PR( B AND C) - PR(A AND C)
    +PR(A AND B AND C)

FAULT TREE ANALYSIS - CUTSETS

MOST FAULT TREE ANALYSIS TECHNIQUES START WITH THE GENERATION OF CUTSETS

A CUTSET IS A SET OF BASIC EVENTS; IF ALL THE BASIC EVENTS IN A CUTSET OCCUR, THEN THE TOP EVENT (SYSTEM FAILURE) OCCURS.

A MINCUT (MINIMUM CUTSET) IS ONE THAT CONTAINS NO REDUNDANT ELEMENTS. IF AN ELEMENT IS REMOVED FROM A MINCUT, IT CEASES TO BE A MINCUT.

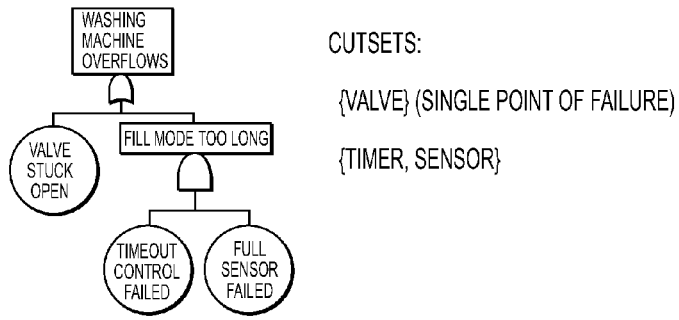

CUTSETS:

{VALVE} (SINGLE POINT OF FAILURE)

{TIMER, SENSOR}

*FIG. 15*

**PROBABILISTIC ANALYSIS
USING BINARY DECISIONS DIAGRAMS**
FAULT TREE MODEL
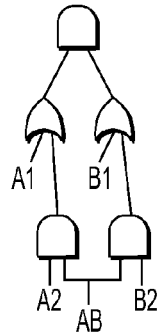
BDD REPRESENTATION
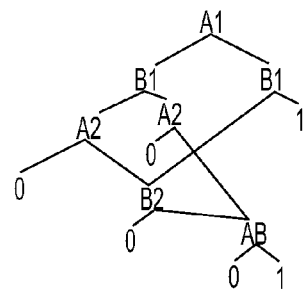
FIG. 16
FUNCTIONAL DEPENDENCY GATE
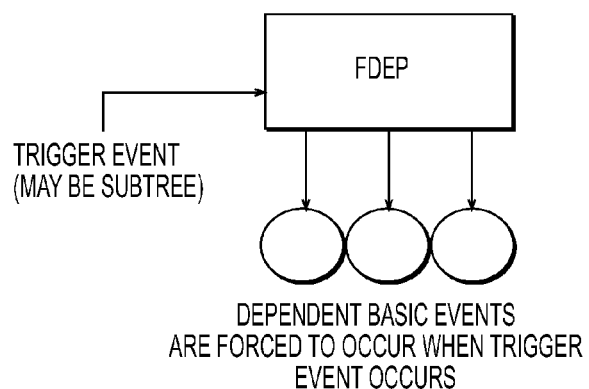
FIG. 17

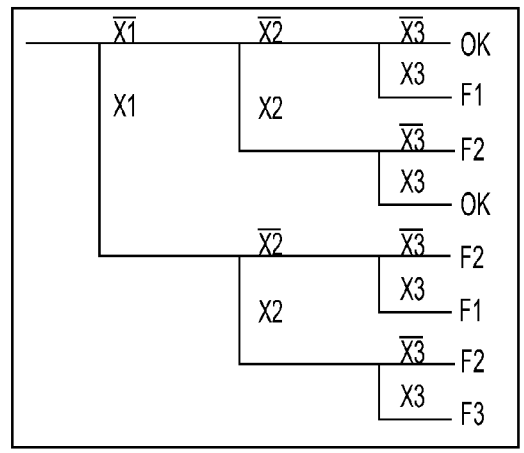
FIG. 20
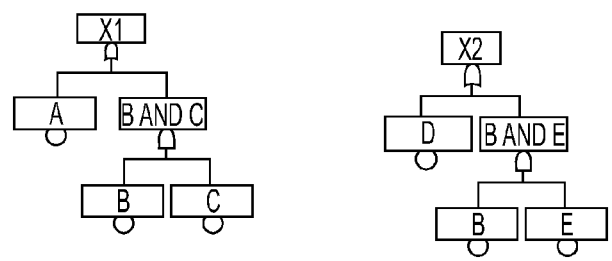
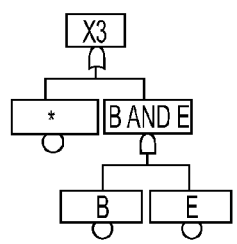
FIG. 21

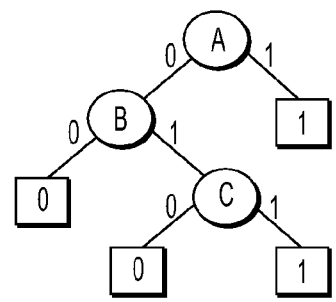
(A) BDD STRUCTURE OF X1
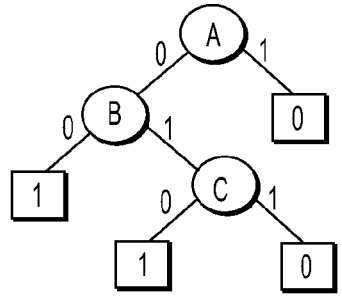
(B) DBDD STRUCTURE OF X1
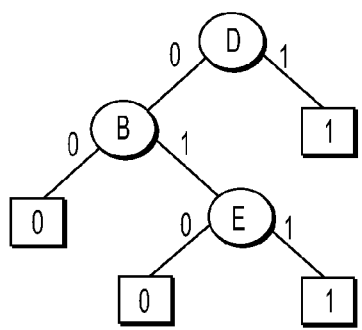
(C) BDD STRUCTURE OF X2
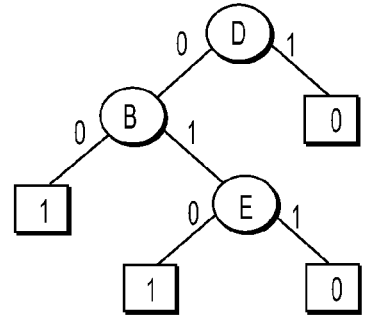
(D) DBDD STRUCTURE OF X2
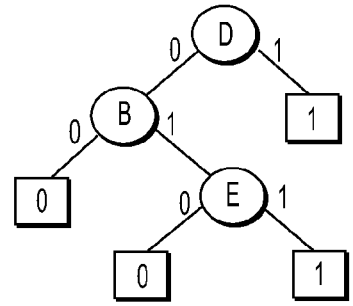
(E) DBDD STRUCTURE OF X3
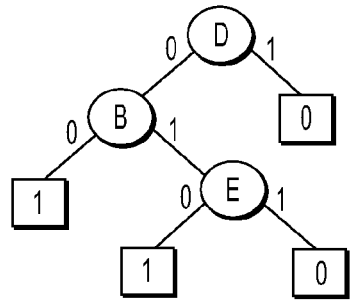
(F) DBDD STRUCTURE OF X3
FIG. 22

(A) BDD STRUCTURE OF X1X2    (B) BDD STRUCTURE OF X1X2X3

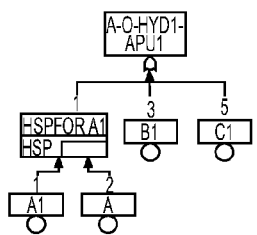

FIGURE B6(A). FT OF SUBSYSTEM 1
IGNORE FDEP

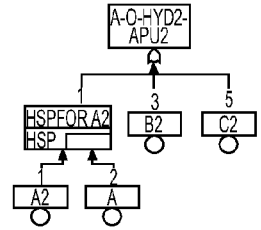

FIGURE B6(B). FT OF SUBSYSTEM 2
IGNORE FDEP

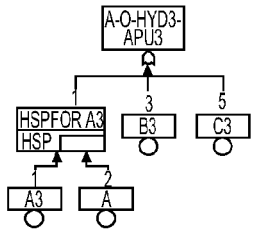

FIGURE B6(C). FT OF SUBSYSTEM 3
IGNORE FDEP

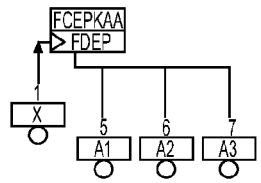

FIGURE B6(D). DEPENDENCE AMONG
COMPONENTS $A_1$S

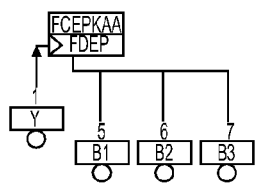

FIGURE 6(F). DEPENDENCE AMONG
COMPONENTS $C_1$S

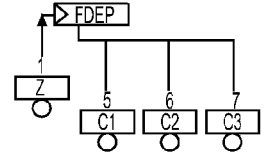

FIGURE 6(F). DEPENDENCE AMONG
COMPONENTS $C_1$S

NOTATION

| | |
|---|---|
| $A_{ri=1,2,3}$ | $APU_T$ CONTROL FAILS ON ASCENT |
| A | $APU_T$ CONTROL SPARE FAILS ON ASCENT |
| $B_{ri=1,2,3}$ | $APU_T$ TANK FAILS ON ASCENT |
| $C_{ri=1,2,1}$ | $APU_T$ OVERSPEED ON ASCENT |
| x | COMMON CAUSE FAILURE OF THE APU CONTROL |
| y | COMMON CAUSE FAILURE OF THE APU TAANK |
| z | COMMON CAUSE OVERSPEED FAILURE OF THE TRUBINE WHEEL |

FIG. 29

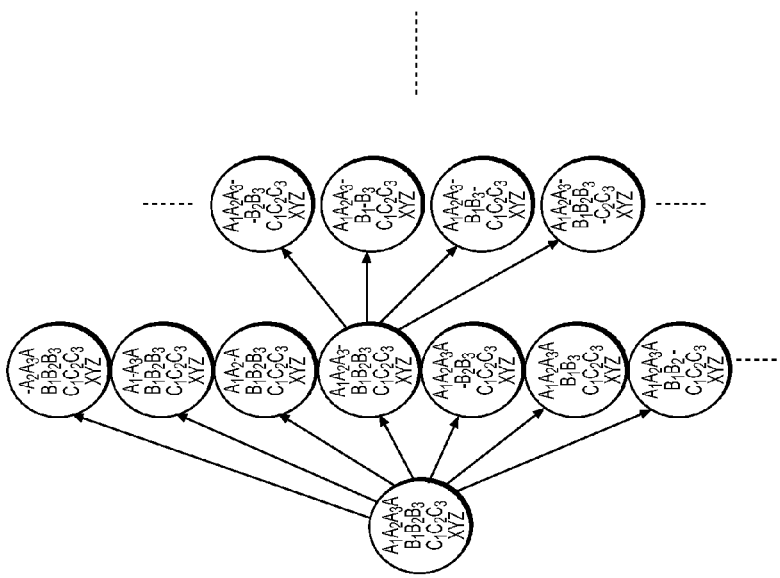
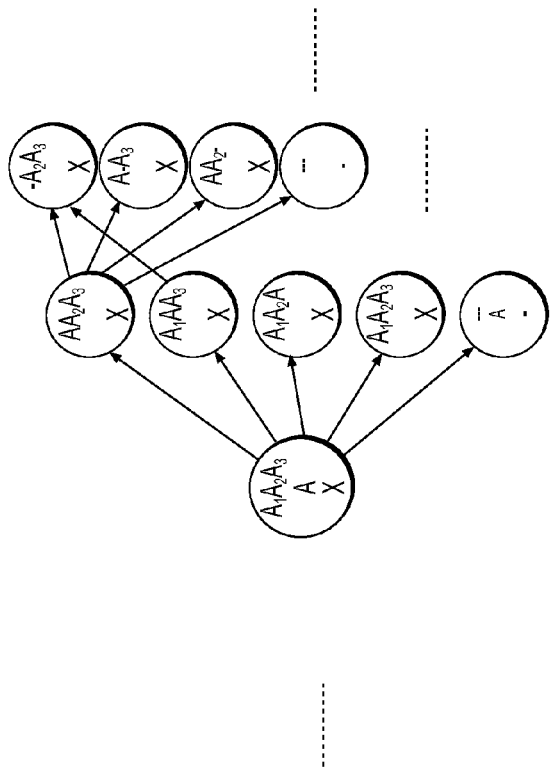
FIG. 30(A)
FIG. 30(B)

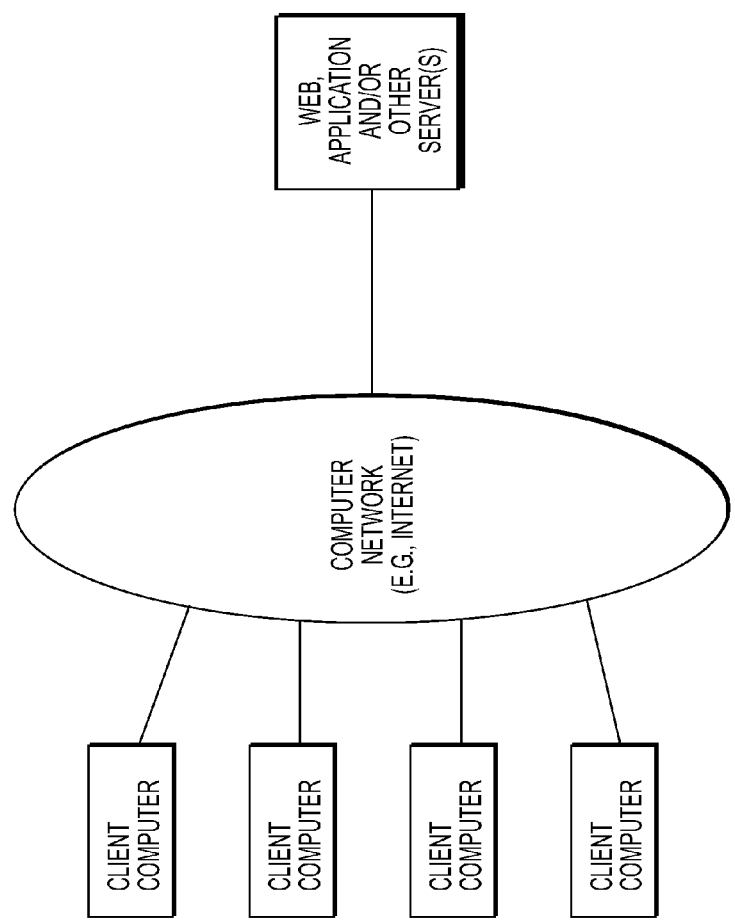

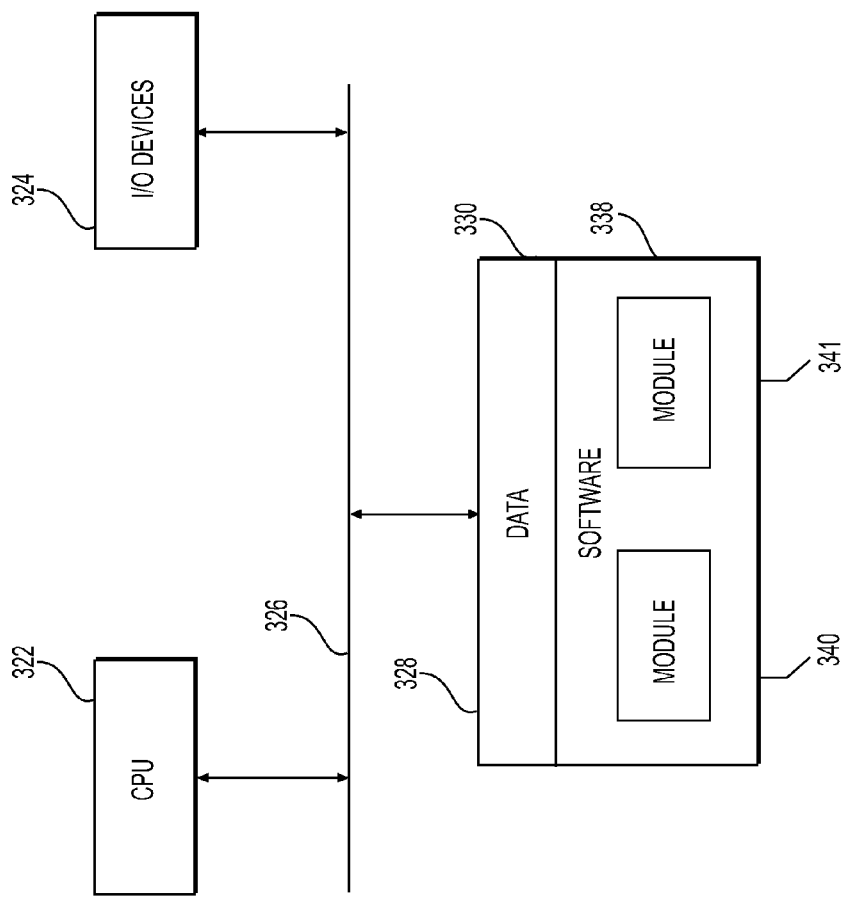

METHOD AND SYSTEM FOR DYNAMIC PROBABILISTIC RISK ASSESSMENT

The present application claims priority under 35 U.S.C. 119 to U.S. Provisional Application No. 60/750,001, filed on Dec. 13, 2005, entitled Method and System for Dynamic Probabilistic Risk Assessment and to U.S. Provisional Application No. 60/637,847, filed on Dec. 21, 2004, entitled Method and System for Dynamic Probabilistic Risk Assessment, the entire disclosures of which prior provisional applications are incorporated herein by reference.

This present invention was made with United States Government support under contract number NASI-02076 awarded by NASA. The United States government has certain rights in the present invention.

BACKGROUND

1. Field of the Invention

The present application relates to systems and methods for performing risk assessment.

2. Background Discussion

The "Probabilistic Risk Assessment Procedures Guide for NASA Managers and Practitioners" defines Probabilistic Risk Assessment (PRA) as follows: "Probabilistic Risk Assessment (PRA) is a comprehensive, structured, and logical analysis method aimed at identifying and assessing risks in complex technological systems for the purpose of cost-effectively improving their safety and performance." A PRA model often uses a combination of Event Tree (which represents a complex super system of events) and Fault Tree (which represents sub systems of events) models to analyze potential failure scenarios to determine their probability of occurrence, which when combined with an analysis of their effects, provides a quantitative assessment of risk. The combination of ET and FT models has proven effective for the analysis of a variety of critical systems, most notably in the nuclear and aerospace communities. Several software tools support the ET/FT combination for PRA, including QRAS (by Item software) (see, e.g., U.S. Pat. No. 6,223,143, Apr. 24, 2001, Quantitative risk assessment system (QRAS)) and SAPHIRE (by INEL).

With the increasing use of computer-based systems for critical applications, the FT method has expanded to allow for the analysis of failure modes and effects that are unique to these systems. The expansion of the FT methodology to allow the analysis of computer-based systems has resulted in the DFT (Dynamic Fault Tree) methodology. The DFT methodology is seeing increased use in research and industry for a variety of applications. DFT analysis is fully supported by the GALILEO software tool (see, e.g., K. Sullivan, et al., "The Galileo Fault Tree Analysis Tool," ftcs p. 232; Twenty-Ninth Annual International Symposium on Fault-Tolerant Computing, 1999); in addition, both RELEX and RELIASOFT provide some support for DFT constructs in their reliability analysis software.

In the present application, a new methodology and system (referred to herein as DEFT) allows, among other things, the combination of ET and DFT models for dynamic PRA. DEFT defines the mathematical model that results when the DFT model replaces the FT model within the ET framework. Among other things, the methodology and system effectively extends the PRA methodology to allow its application to complex computer-based systems.

While a variety of systems and methods are known (such as, e.g., shown in the below-listed patents and references), there is a continued need for improved systems and methods.

PATENT REFERENCES

The following U.S. Patents and PCT Publication are hereby incorporated by reference herein in their entirety:
1. U.S. Pat. No. 6,223,143, Apr. 24, 2001, Quantitative risk assessment system (QRAS),
2. U.S. Pat. No. 5,754,738, May 19, 1998, Computerized prototyping system employing virtual system design environment,
3. U.S. Pat. No. 4,658,359, Apr. 14, 1987, Method for managing redundant resources in a complex avionics communication system,
4. U.S. Pat. No. 5,581,797, Dec. 3, 1996, Method and apparatus for displaying hierarchical information of a large software system,
5. U.S. Pat. No. 5,559,995, Sep. 24, 1996, Method and apparatus for creating a wireframe and polygon virtual world,
6. U.S. Pat. No. 6,816,576, Nov. 9, 2004, Tree hierarchy and description for generated logs,
7. U.S. Pat. No. 5,590,297, Dec. 31, 1996, Address generation unit with segmented addresses in a microprocessor,
8. U.S. Pat. No. 6,108,670, Aug. 22, 2000, Checking and enabling database updates with a dynamic, multi-modal, rule based system,
9. U.S. Pat. No. 5,802,326, Sep. 1, 1998, Method and apparatus for efficiently updating coordinates of hierarchical views,
10. U.S. Pat. No. 6,747,651, Jun. 8, 2004, System and method for creating bounding volume hierarchies utilizing model simplification,
11. U.S. Pat. No. 5,888,069, Mar. 30, 1999, Mobile modular simulator system,
12. U.S. Pat. No. 6,282,545, Aug. 28, 2001, Mechanism for information extraction and traversal from an object base including a plurality of object classes,
13. U.S. Pat. No. 5,963,653, Oct. 5, 1999, Hierarchical information fusion object recognition system and method,
14. U.S. Pat. No. 5,586,314, Dec. 17, 1996, Graphic information modeling and icon-based intermediate text language generation,
15. U.S. Pat. No. 5,587,935, Dec. 24, 1996, Integrated software development system including group decision support subsystem, application development subsystem, and bridge subsystem there between,
16. U.S. Pat. No. 6,191,787, Feb. 20, 2001, Interactively constructing, editing, rendering and manipulating geoscience models,
17. U.S. Pat. No. 6,487,578, Nov. 26, 2002, Dynamic feedback costing to enable adaptive control of resource utilization,
18. U.S. Pat. No. 6,151,683, Nov. 21, 2000, Rebuilding computer states remotely,
19. U.S. Pat. No. 5,991,769, Nov. 23, 1999, System for facilitating home construction and sales,
20. U.S. Pat. No. 5,948,107, Sep. 7, 1999, Method of handling errors in complex inheritance hierarchies,
21. U.S. Pat. No. 6,820,044, Nov. 16, 2004, Method and Apparatus for a Common-cause Failure Module for Probabilistic Risk Assessment, and
22. PCT Publication No. WO 03/032249 A1, Apr. 17, 2003, Method and Apparatus for a Common-cause Failure Module for Probabilistic Risk Assessment.

NON-PATENT REFERENCES

The following references are hereby incorporated by reference herein in their entirety:

A1. Andrews J D, Dunnett S J, "Event Tree Analysis using Binary Decision Diagrams", IEEE Trans. Reliability, Vol 49, 2000 June, pp 230-238.
A2. 2. William R Dunn, "Practical Design of Safety-Critical Computer Systems", Reliability Press 2002, pp 166-176.
A3. Rolex Software Corporation, "Visual Reliability Software", URL: http://www.event-tree.com.
A4. Rauzy, A., "A Brief Introduction to Binary Decision Diagrams". European Journal of Automation, Vol 30, No. 8, 1996.
A5. Sinnamon, R M. and Andrews, J. D., "Quantitative Fault Tree Analysis Using Binary Decision Diagrams", European Journal of Automation, Vol 30, No. 8, 1996.
A6. Gulati, R and J B Dugan, "A Modular Approach for Analyzing Static and Dynamic Fault Trees," 1997 Proceedings of the Annual Reliability and Maintainability Symposium, Philadelphia, Pa., January 1997, pp 5763.
A7. Y. Dutuit and A. Rauzy, "Exact and truncated computations of prime implicants of coherent and noncoherent fault trees with Aralia," Reliability Engineering and System Safety, 58 (1997) 127: 144.
A8. Ragavan Manian, Joanne Bechta Dugan, David Coppit, and Kevin Sullivan, "Combining various solution techniques for dynamic fault tree analysis of computer systems". In Proceedings Third IEEE International High Assurance Systems Engineering Symposium, pages 21-28, Washington, D.C., 13-14 Nov. 1998. IEEE.
A9. Y. Dutuit and A. Rauzy, "A linear time Algorithm to find Modules of Fault Trees," IEEE Transactions on Reliability, Vol. 45, No. 3, September 1996, pp. 422-425.

ADDITIONAL NON-PATENT REFERENCES

The following references are hereby incorporated by reference herein in their entirety:

B1. Martin L. Shooman, "The equivalence of reliability diagrams and fault-tree analyses," IEEE Transactions on Reliability, R-19(2):74-5, May 1970.
B2. Joanne Bechta Dugan, Salvatore Bavuso, and Mark Boyd, "Dynamic fault-tree models for fault-tolerant computer systems," IEEE Transactions on Reliability, 41(3): 363-77, September 1992.
B3. Rohit Gulati and Joanne Bechta Dugan, "A modular approach for analyzing static and dynamic fault trees," Proceedings of the Annual Reliability and Maintainability Symposium, pages 57-63, Philadelphia, Pa., 13-16 Jan. 1997.
B4. Hong Xu and Joanne. Bechta Dugan, "Combining Dynamic Fault Trees and Event Trees for Probabilistic Risk Assessment," Proceedings of the Annual Reliability and Maintainability Symposium, 2004, reproduced, modified and presented as "Outline of Results" above.
B5. Dutuit Y., Rauzy Antoine, "Exact and Truncated Computations of Prime Implicants of Coherent and non-Coherent Fault Trees within Aralia," Reliability Engineering and System Safety, 58:127-144, 1997.
B6. Yong Ou and Joanne Bechta Dugan, "Modular Solution of Dynamic Multi-Phase Systems," To appear, IEEE Transactions on Reliability, 2004.

ADDITIONAL NON-PATENT REFERENCES

The following references are hereby incorporated by reference herein in their entirety:

C1. T. Khoda, E. J. Henley and K. Inoue, "Finding modules in fault trees," WYE Trans. on Reliability, vol. 38, no. 2, pp. 165-176, June 1989.
C2. Yves Dutui and Antoine Rauzy, "A linear-time algorithm to find modules of fault trees," IEEE Trans. on Reliability, vol. 45, no. 3, pp. 422-425, September 1996.
C3. Rohit Gulati and J. B. Dugan, "A modular approach for analyzing static and dynamic fault trees," Proceedings of Annual Reliability and Maintainability Symposium, annual, pp. 57-63, Jan. 13-16, 1997.
C4. Joanne Bechta Dugan, Salvatore Bavuso and Mark Boyd, "Dynamic fault tree models for fault tolerant computer systems;" IEEE Transactions on Reliability, September 1992:
C5. Joanne Bechta Dugan, Bharath Venkatarama and Rohit Gulati, "DIFtree: Asoftware package for the analysis of dynamic fault tree models," Proceeding of Annual Reliability and Maintainability Symposium, pp 64-70, Jan. 13-16, 1997.
C6. Zhihua Tang, "Common Cause Failure analysis and Improved Solution Techniques for Dynamic Fault Trees," M.S. thesis, pp. 25-26, University of Virginia, May 2002.
C7. NASA Johnson Space Center, Safety, Reliability, and Quality Assurance Office (NA) and Space Shuttle Division (NC), Contract No. NAS9-19180, "Auxiliary Power Unit (APU) Subsystem System analysis Notebook," Space Shuttle Probabilistic Risk Assessment, SPRAT SYS-13.

SUMMARY OF THE PREFERRED EMBODIMENTS

The preferred embodiments of the present invention can significantly improve upon existing methods and/or apparatuses.

According to some aspects of some of the embodiments of the present invention, a method, system and computer readable medium provides for dynamic probabilistic risk assessment (PRA) that, among other things, extends the traditional PRA methodology to allow the analysis of computer-based systems. Prior PRA methodologies depend on a combination of event trees and fault trees to model system failure and success scenarios as a combination of constituent events. Prior PRA methodologies lack the capabilities needed to analyze computer-based systems, particularly with respect to dependencies between events. In some preferred embodiments, a dynamic PRA method extends the event tree/fault tree method to account for such dependencies as functional dependencies and shared spares.

The Dynamic PRA method, system and computer readable medium allows for, among other things, the use of the top node of DFT (dynamic fault tree) models (which represent sub systems of events) as pivot nodes in the overall event tree risk model (which represents a complex super system of events). The DFT model extends the traditional FT model with special constructs for dependencies, including, e.g., hot, cold and warm spares (see FIG. 17). In preferred embodiments, the Dynamic PRA methodology carefully constructs a set of Markov models and logic models for failure scenario. The dynamic PRA methodology determines the probability of occurrence of each scenario.

In the preferred embodiments, the dynamic PRA methodology and system extends the PRA methodology to support the analysis of critical computer-based systems.

In summary, some uses of some of the embodiments of the present invention method, system and computer readable medium provides for, but not limited thereto, the following:

Many government agencies or other entities may benefit by use of probabilistic risk assessment (PRA) during the development of critical systems. These critical systems include, e.g., aerospace systems, chemical process systems, nuclear systems, medical devices, etc. Process control systems (such as those used for chemical processes) also often need to be evaluated for risk.

As critical systems become more dependent on computer implementations, their risk assessment becomes more complex. Traditional PRA methods cannot adequately account for the special failure modes and behaviors of computer based systems. Thus, there was—prior to the present invention—a need for a method for probabilistic risk assessment of critical computer-based systems.

Software tools for PRA are provided by several vendors. These include the above-noted ITEM software, RELEX software and RELIASOFT. The companies that provide these latter software products, would be interested in the methodologies described in the present application. By way of example, ITEM, would benefit because they market QRAS, the PRA tool that is recommended by NASA to its safety and mission assurance practitioners. Among other things, the preferred embodiments herein involving dynamic PRA methodologies would complement QRAS nicely.

According to some embodiments, a method for calculating Probabalistic Risk Assessment (PRA) of a complex super system through the use of an event tree (ET) having one or more individual paths and whose event nodes are top events of Static Fault Trees (SFT) and Dynamic Fault Trees (DFT) is performed that includes: calculating the probability of various paths of said event tree (ET) by calculating the probability of various event nodes of the individual paths of said event tree (ET).

In some examples, the method includes: said event tree (ET) is a binary tree; said event nodes comprising internal nodes, wherein said internal nodes represent mitigating or aggravating events in said complex super system; and said event nodes comprising leaf nodes, wherein said leaf nodes represent failure of said complex super system, non-failure of said complex super system, or non-occurring conditions in said complex super system. In some further examples, said Static Fault Trees (SFT) is a structured graph of an SFT sub system of events of said complex super system, said Static Fault Trees (SFT) top events represent a failure in a component corresponding to an event of said complex super system, and said Static Fault Trees (SFT) comprises one or more SFT child events, wherein said child events are sub events of said complex super system and wherein said one or more SFT child events are connected by ordinary Boolean AND, OR and/or N/K gates. In some further examples, the method includes said Dynamic Fault Trees (DFT) is a structured graph of a DFT sub system of events of said complex super system, said Dynamic Fault Trees (DFT) top event represents a failure in a component corresponding to an event of said complex super system, and said Dynamic Fault Trees (DFT) comprises one or more child events, wherein said child events are sub events of said complex super system and wherein said one or more child events are connected by the gates comprising: Functional Dependency Gates (FDEP gates) (see, e.g., Dugan, J. B. et al., "Dynamic Fault Tree Analysis of a Reconfigurable Software System, University of Virginia, FIGS. 3, 4 and 5) wherein said FDEP gates model situations where one component's correct operation is dependent upon the correct operation of some other component, Spare Gates (SP gates), wherein said SP gates for model cold, warm and hot pooled spares, Priority AND (PAND) wherein said PAND gates model ordered ANDing of events.

In some further examples; the calculation of the probability of one or more pivot nodes of said complex super system that are top events of SFTs which have no sub events of said complex super system in common comprises inclusion/exclusion probability analysis or Binary Decision Diagram (BDD) analysis. See, e.g., Appendix A below. In some further examples, the calculation of the probability of two or more pivot nodes of said complex super system that are top events of SFTs which have shared sub events of said complex super system consists of ANDING said SFT pivot nodes along the path and applying inclusion/exclusion probability analysis or Binary Decision Diagram analysis (see, e.g., Appendix A) Moreover, in some further examples, the calculation of the probability of one or more pivot nodes (see, e.g., Dugan, J. B. et al., "Integrating Event Trees and Dynamic Fault Trees: Technical Feasibility Study," University of Virginia, p. 4) of said complex super system are top events of DFTS that have no shared sub events of said complex super system is calculated via modularization using a combination of BDD and Markov Chain (MC) analysis. Modularization can be accomplished using the GALILEO software (see http://www.cs.virginia.edu/~ftree/index.html and http://www.fault-tree.net/papers/sullivan-galileo-fta-tool.pdf). The mathematics of modularization and the application of BDD and Markov Chain analysis is described in "A Modular Approach for Analyzing Static and Dynamic fault Trees" 1997. See also "Event Trees and Dynamic Fault Trees." In some further examples, in the calculation of the probability of two or more pivot nodes of said complex super system are top events of DFTs that have shared sub events of said complex super system is produced by ANDing the DFTs to produce a third DFT. In yet some further examples, the probability of said third DFT is calculated using a combination of BDD and Markov Chain (MC) analysis. And, in yet some further examples, for a DFT the negation of a spare gate is the negation of the logical output of the gate; the negation of a PAND gate with inputs A and B means that A did not occur, B did not occur or A occurred after B; if the PAND is true for simultaneous events, then the negation of the PAND is not; and the negation of the DFT constraints, such as FDEP, SEQ (Sequence Enforcing constraint) and CCG (common-cause group) is inconsequential, since none of the constraints has a logical output.

The above and/or other aspects, features and/or advantages of various embodiments will be further appreciated in view of the following description in conjunction with the accompanying Figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying Figures, in which:

FIG. 8 depicts DFTs for three subsystems of a dynamic system with shared events.

FIG. 12 depicts the basic events of Fault Trees, both dynamic and static.

FIG. 13 depicts the Static Fault Tree logic gates.

FIG. 15 depicts minimal cutsets (MCS) of fault trees.

FIG. 16 depicts a Binary Decision Diagram representation of a Static Fault Tree. For an introduction to BDDs, see Anderson, H. R., "An Introduction to Binary Decision Diagrams," Lecture notes for 49285 Advanced Algorithms E97, Department of Information Technology, Technical University of Denmark Building 344, DK-2800 Lyngby, Denmark, October 1997. For example, any Boolean expression (including Static Fault Trees) can be represented by a unique BDD, which is a direct acyclic graph (DAG). If a node of a BDD is true, the path to its right child is traversed. Otherwise, the path to its left child is traversed. BDDs are used to calculate the probability of a top event of an SFT, as will be shown later.

FIG. 17 depicts the symbol for a Functional Dependency gate, one of the gates used in Dynamic Fault Trees.

FIG. 20 depicts an example event tree.

FIG. 21 depicts the fault tree structures of all three pivot events in ET.

FIG. 22 depicts the BDD and DBDD structures of pivot events.

FIG. 29 depicts FT structures.

FIG. 30(A) depicts a Markov Chain for the whole system.

FIG. 30(B) depicts a Markov Chain for module 1.

FIG. 32(A) shows an illustrative multi-user client server system with which some embodiments of the present invention can be implemented.

FIG. 32(B) shows an illustrative computer 320 that can be used to implement computerized process steps in some embodiments of the invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the various inventions described herein and that such examples are not intended to limit the invention to preferred embodiments described herein and/or illustrated herein.

As system analysis methodologies, both event tree analysis (ETA) and fault tree analysis (FTA) are used in probabilistic risk assessment (PRA), especially in identifying system inter-relationships due to shared events. Although there are differences between them, ETA and FTA, are so closely linked that fault trees (FT) are often used to quantify system events that are part of event tree (ET) sequences (Ref 1). The logical processes employed to evaluate ET sequences and quantify the consequences are the same as those used in FTA. Although much work has been done to combine FT and ET, traditional methods only concentrate on combining static fault trees (SFT) and ET. Note that Static Fault Trees (SFT) use AND, OR and N/K gates to link their sub system of events as depicted in FIG. 12.

Figure 18:
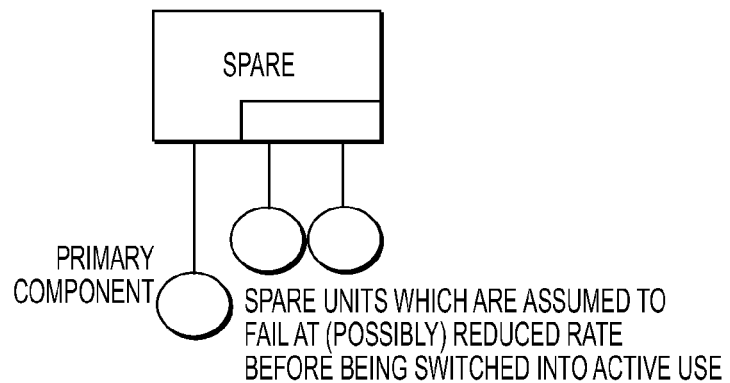
FIG. 18 depicts a spare (SP) gate, one of the gates used in Dynamic Fault Trees. Hot spares should have failure rates similar to those of primary components. Warm spares should have slower failure rates. Cold spares are usually assumed not to fail before usage.
Figure 19:
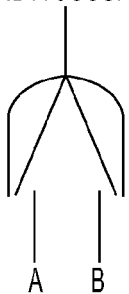
FIG. 19 depicts a PAND gate, one of the gates used in Dynamic Fault Trees.

Our main concern is considering how to combine dynamic fault trees (DFT) and ET. Dynamic Fault Trees (DFT) use FDEP, SPARE and PAND gates to link their subsystem of events as depicted in FIGS. 17, 18 and 19. We proposed a reasonable approach in this section, which is illustrated through a hypothetical example. Because of the complexity of dynamic systems, including the huge size and complicated dependencies, there may exist contradictions among different dynamic subsystems. One noteworthy benefit of our approach is that we avoid the generation of such contradictions in our model. Another notable benefit is that efficiency may be improved through modularization. Other benefits would be appreciated based on this disclosure by those in the art.

1. Introduction

Figure 1:
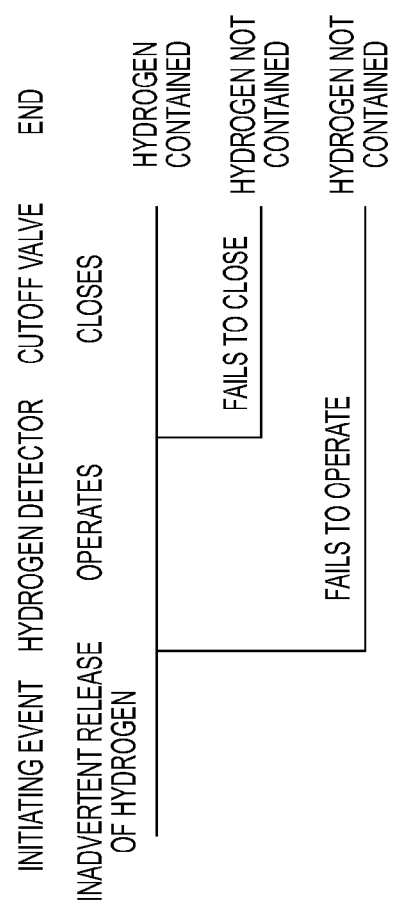
FIG. 1 depicts an event tree for a propellant supply system.

An ET is a graphical representation of mitigating or aggravating events that may occur in response to some initiating event or perturbation in the system. It represents a complex super system of events. As the number of events increases, the picture fans out like the branches of a tree (See Refs. A2, A3 listed above). ETA was first introduced for the nuclear industry and since then has been applied in diverse industries. ETA techniques are helpful to identify the consequences that can result in the following occurrence of a potentially hazardous event. FIG. 1 is a simple illustrative and non-limiting example of a propellant supply system (see Ref. A2 listed above). The initiating event is the induced hazard "inadvertent release of hydrogen," which forms the beginning of the ET. From here, the tree branches into the two possible responses that the hydrogen detector can have, namely to detect or not to detect the released hydrogen. Each of these possible events in turn branches into the two possible states that the cutoff valve can either close or remain open when commanded shut. As the Figure indicates, hydrogen is contained only along the path in which both the detector and cutoff valve operate.

A FT is another kind of graphical representation, representing a sub system of events, which is constructed by defining the TOP undesired event and then using backward logic to define causes. Basic events at the bottom of the fault tree are linked via logic symbols (known as gates) to one or more higher-level events (see Ref A2 listed above) (see FIG. 13 for SFT gates and FIGS. 17, 18 and 19 for DFT gates). FTA techniques have been widely adopted by a wide range of engineering disciplines as one of the primary methods of performing reliability and safety analysis.

Figure 2:
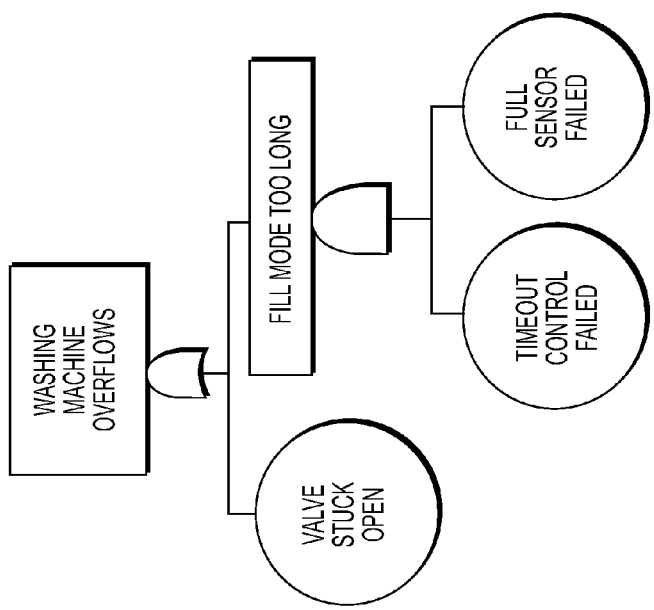
FIG. 2 depicts a Static Fault Tree for a washing machine system.

FIG. 2 is a simple illustrative and non-limiting example of SFT for a hypothetical washing machine system. The FT structure function for the example is that the system would fail (i.e., overflow) if either the valve fails OR both the timeout control and the full sensor fail.

Although ETA and FTA are quite different in the structure forms, the logic orders and so on, they are often used together. The standard approach to combine FT and ET is that the branch point (pivot/internal node) of an ET can be treated as a FT. The probability of the top event of the FT serves as the branch probability for the ET. In dealing with FTs, much work has been done involving minimal cut set (MCS) (see, e.g., FIG. 15) or prime implicant (PI) based methods (see, e.g., Ref A7 listed above). J. D. Andrews and S. J. Dunnett proposed a BDD-based approach to combine SFT and ET so as to overcome the inefficiency and inaccuracy of previous methods for non-coherent systems (see Refs. A1, A4, A5 listed above). Among other things, one goal herein was to consider the possibility and a feasible way to combine DFT and ET, which had not been studied in previous work.

The following sections of this document include: Section 2 which involves a brief comparison of ET and FT to indicate their relationship (under the heading A Brief Comparison of ET and FT); Section 3 (under the heading Previous Work to Combine SFT and ET); identifications of three different cases to consider when combining FT and ET, including static systems, dynamic systems with no shared events and dynamic systems with shared events. In order to illustrate the 3rd case that includes dynamic subsystems and shared events, a hypothetical example is used and analyzed in Section 4 (under the heading COMBINE DFT AND ET).

2. A Brief Comparison of ET and FT

ET and FT are quite different in many aspects. An ET is an inductive or forward logic representation, which starts from an initiating event and includes all possible paths, whose branch points represent successes and failures (sometimes can also represent partial failures). The quantification of an ET is used to predict the frequency of each outcome (See Ref A1 listed above). While a FT is a deductive or backward logic representation, which involves specifying a top event to analyze (e.g., always a system failure), followed by identifying all of the associated elements in the system that could cause that top event to occur.

Figure 3:
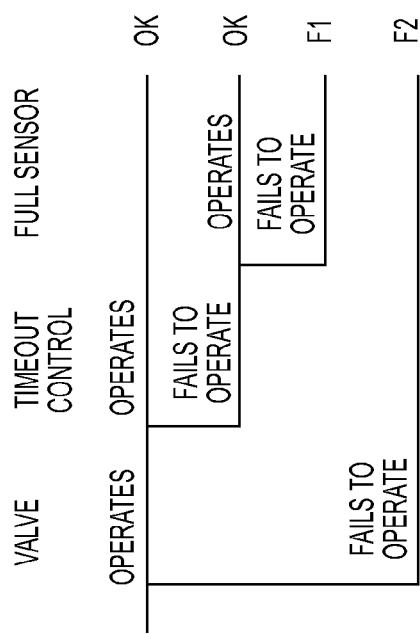
FIG. 3 depicts an event tree for a washing machine system.

Although there exist differences between ET and FT, they are closely related to each other. The first thing is that the same system can be represented either by an ET or a FT. FIG. 3 shows the ET structure for the same washing machine system in FIG. 2, whose outcomes tell us that the system would fail if either the end point F1 or F2 occurs, namely both the timeout control and the full sensor fail OR the valve fails.

The second connection between FT and ET is that the branch point events of an ET can be defined using FT structures. We are more interested in this point and will discuss three cases below.

3. Previous Work to Combine SFT and ET

Figure 4:
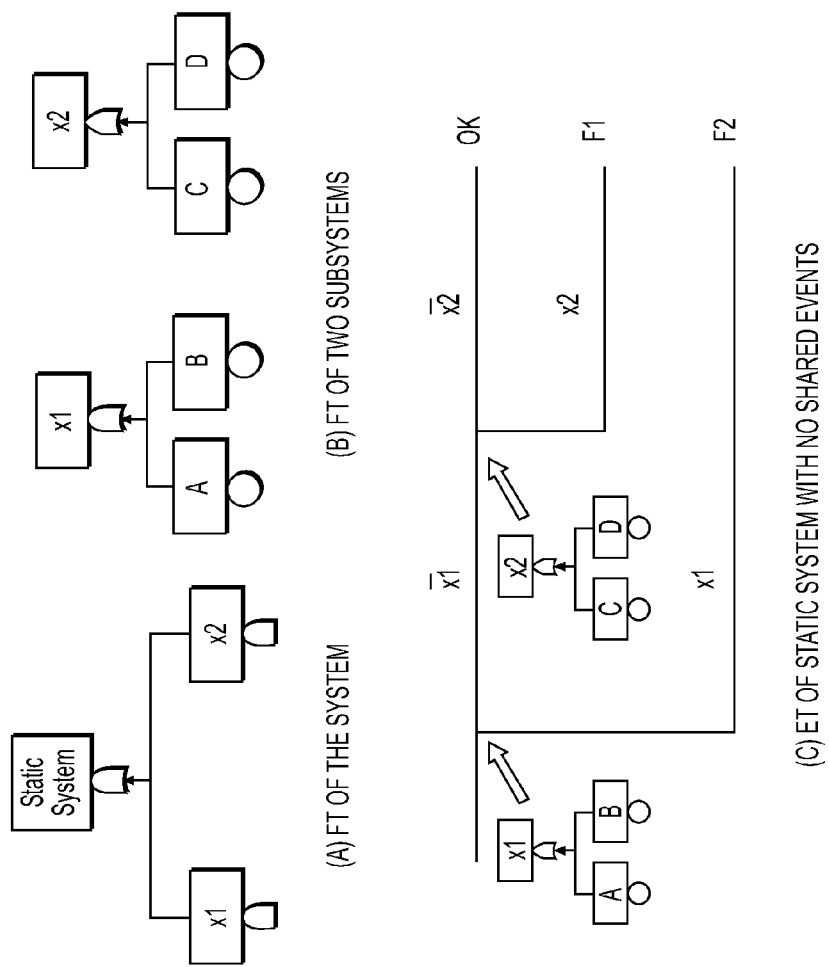
FIG. 4 depicts a combined SFT and ET for a static coherent system.

Some researchers have realized the benefit and possibility of combining FT and ET for PRA. For a static coherent system where the branch point events of an ET are independent of each other, quantification is easy to achieve by multiplying the frequency of the initiator and the probabilities of passing along each branch leading to an outcome scenario. The exact probability of each branch point can be obtained by Inclusion-Exclusion Expansion (IEE) approach given in Equation (1). $C_r$ is the MCS (minimal cut set—see, e.g., FIG. 15), while P(T) is the top event probability. FIG. 4 shows the process to combine SFT and ET for a simple static coherent system. In the ET shown in FIG. 4(c), each branch point is replaced with a SFT.

$$P(T) = \sum_{i=1}^{n} P(C_i) - \sum_{all\ i<j} \sum P(C_i \cap C_j) + \sum \sum_{all\ i<j<k} \sum P(C_i \cap C_j \cap C_k) + \ldots + (-1)^{n+1} P(C_1 \cap C_2 \cap \ldots \cap C_n) \quad (1)$$

If a static coherent system is very large, approximation calculating is adopted to yield a result of acceptable accuracy, either using IEE by truncating terms after the first or second one or using MCS upper-bound shown in equation (2)

$$P(T) \le 1 - \prod_{i=1}^{n} (1 - P(C_i)) \quad (2)$$

Figure 5:
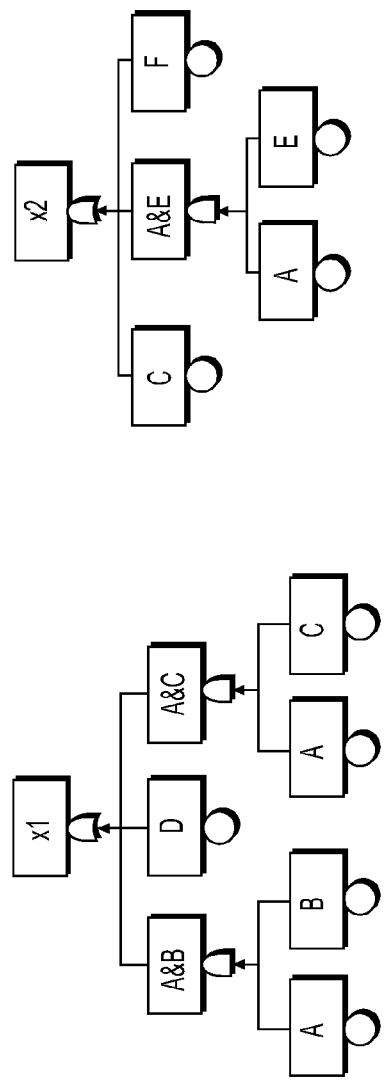
FIG. 5 depicts the FT of two dependent subsystems.

However, the approaches used in a static coherent system are not useful for a static non-coherent system, such as a system shown in FIG. 5, whose subsystems X1 and X2 have some shared events. Because the convergence of IEE can be very slow and truncating a large number of terms will lead to inaccuracy, therefore J. D. Andrews and S. J. Dunnett provide a BDD-based approach, which overcomes these shortcomings (see Ref A1 as listed above).

4. Combine DFT and ET

So far, all cases above only concentrate on static systems; no research has considered the relationship between DFT and ET. Although various solution techniques have been utilized in DFT analysis (see Ref A8 as listed above), the question is can we use these techniques to combine DFT and ET? If yes, how? In this section we will look at some dynamic systems, and use MC (Markov Chain), the normal tool to show our idea.

4.1 Combine DFT and ET without Shared Events

For dynamic systems where no dependencies exist in different subsystems, each subsystem can be resolved separately, either using a MC for any subsystem, or a MC (Markov Chain) for a dynamic one and a combinatorial tool such as BDD for a static one. For simplicity, only MC is used in our example.

Since each state in a MC represents either UP or DOWN of the corresponding subsystem, it is easy to represent any branch point of an ET via MC, with UP states representing the positive branch point and DOWN states representing the negative branch point.

Figure 6:
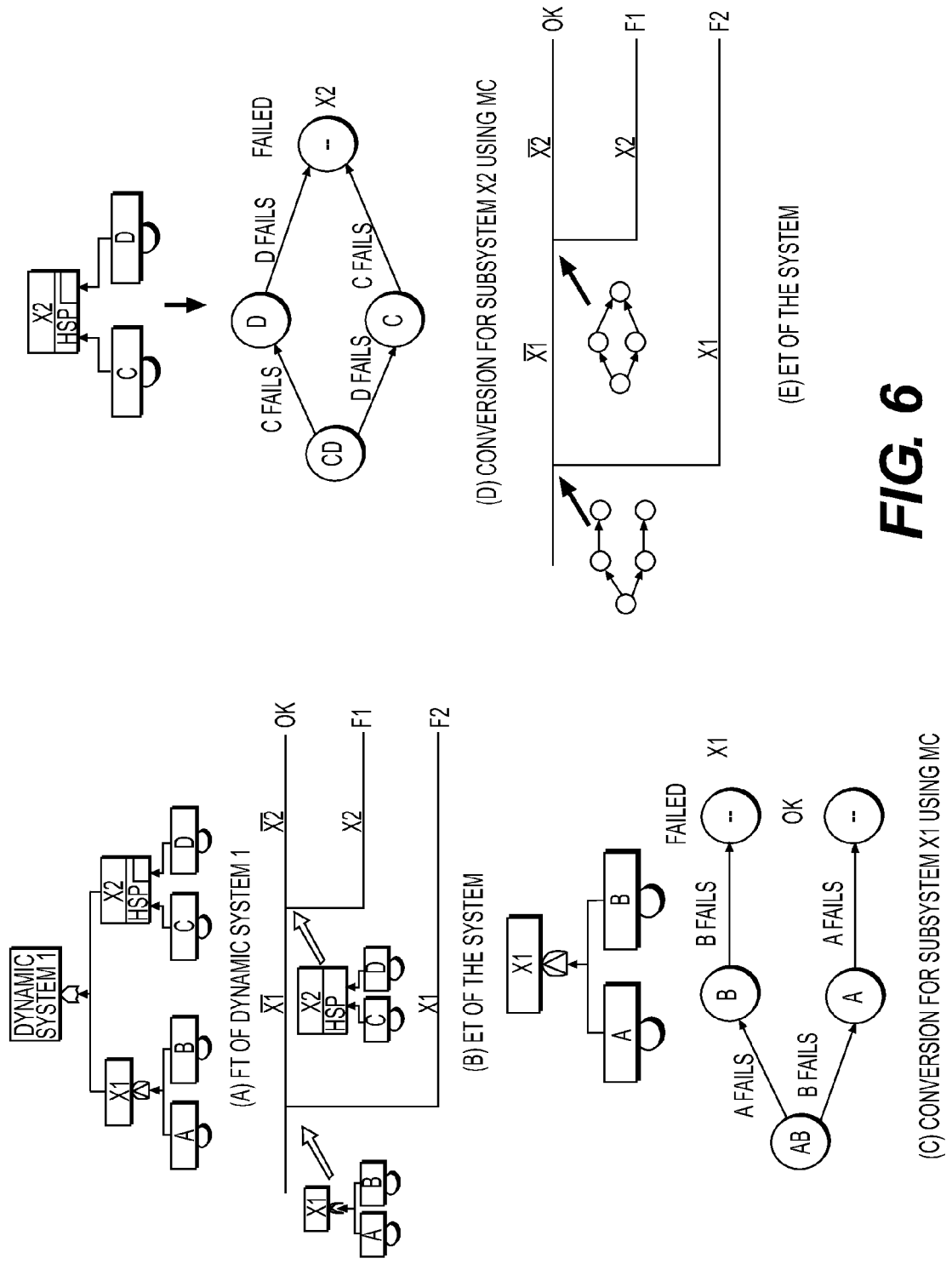
FIG. 6 depicts a combined DFT and ET with no static subsystems and no shared events.
Figure 7:
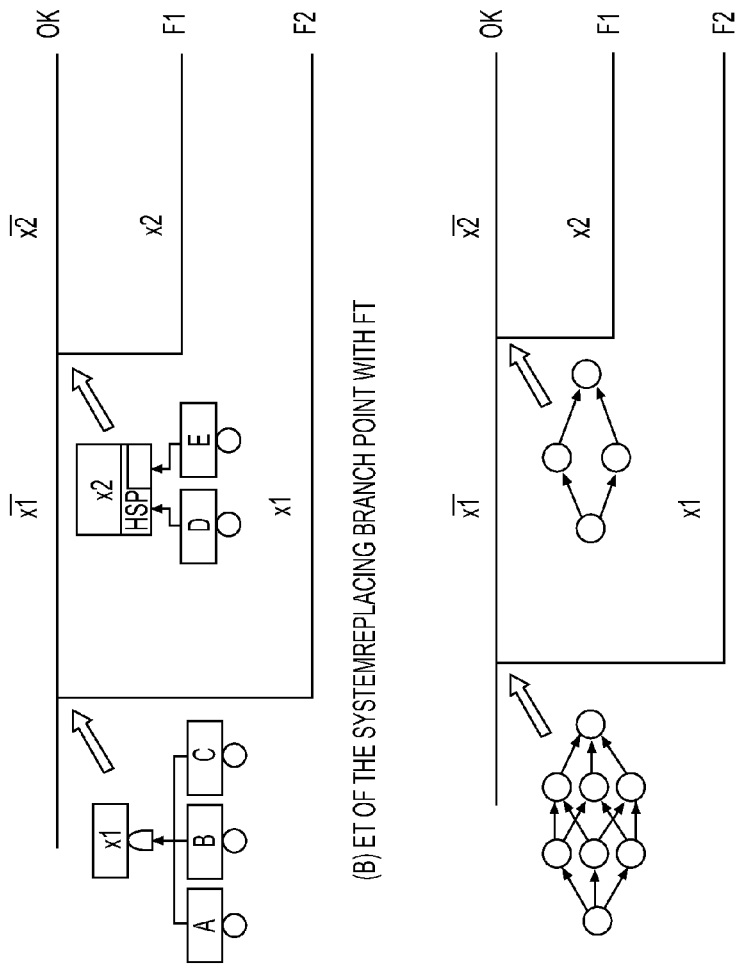
FIG. 7 depicts a combined ET and DFT with no shared events.

Two illustrative examples are given in FIG. 6 and FIG. 7, one with only dynamic subsystems, the other with both static and dynamic subsystems. Since no common or shared events across two or more branch point events, the methods applied in the two examples are the same.

4.2 Combine DFT and ET with Shared Events

For dynamic systems with shared events, on one hand, like static non-coherent systems, we cannot treat subsystems independently due to the dependencies. On the other hand, unlike the BDD-based approach (Binary Decision Diagram—see FIG. 16) used in a static system, De Morgan's Laws are not suitable for dynamic systems. For a good introduction to BDDs, see "An Introduction to Binary Decision Diagrams (BDD).". In summary, any Boolean expression (including Static Fault Trees) can be represented by a unique BDD, which is a direct acyclic graph (DAG). If a node of a BDD is true, the path to its right child is traversed. Otherwise, the path to its left child is traversed. BDDs are used to calculate the probability of a top event of an SFT. Therefore, we are now facing two problems: one is to avoid constructing a single MC for each subsystem both because of the dependencies and the unnecessary redundant work due to shared events; the other is to look for a way to represent all branch points of an ET, especially the negative points. Furthermore, it is unreasonable to construct one MC for the whole system due to the obvious disadvantage of MC that the size would face a state-space explosion problem with the increase of the number of events. A feasible and efficient way is to make use of the concept of modularization by analyzing all related units within one module, and deal with all non-related modules independently (see Refs. A6, A9 listed above).

Figure 9:
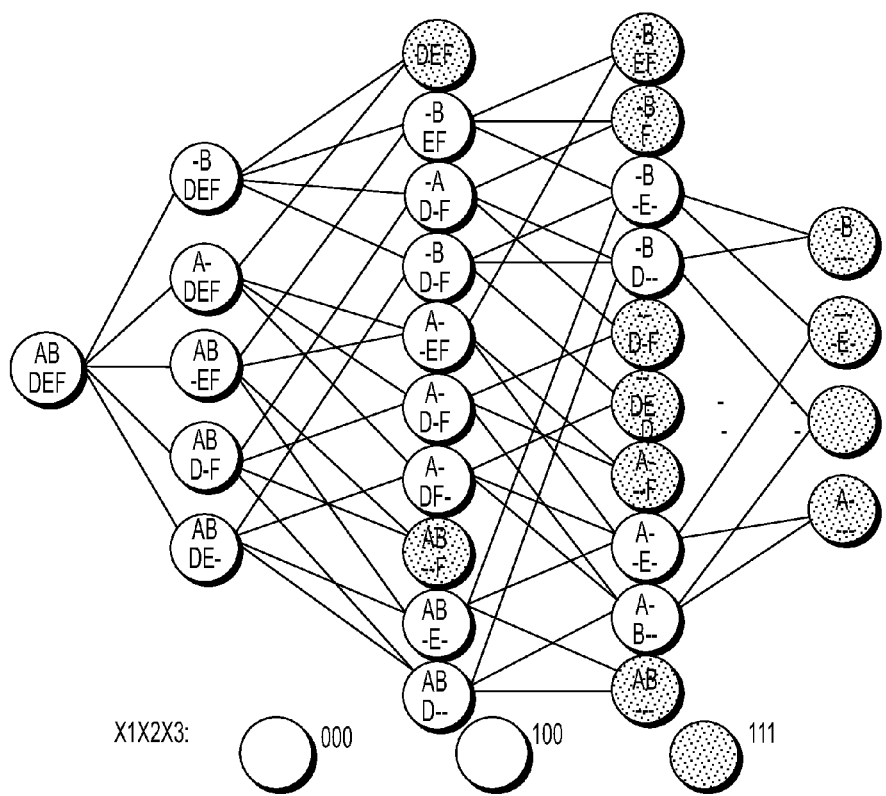
FIG. 9 depicts the Markov Chain (MC) for the dynamic module.
Figure 10:
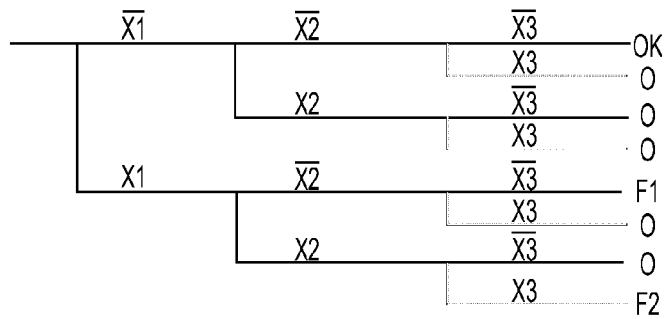
FIG. 10 depicts the ET (Event Tree) for the dynamic module.

This methodology is illustrated by a hypothetical bank account-access example shown in FIG. 8, FIG. 9 and FIG. 10. Three subsystems X1, X2 and X3 are depicted in FIG. 8(a)-(c). XI describes the failure of the first way to access a bank account, which is achieved by a customer operating his/her own personal computer through Internet. X2 means the failure of the second way, through a teller operating one of all three terminals in the bank. The third way occurs under an emergency situation, done by the bank computer system manager operating on a server directly, whose failure structure is represented by X3. Basic event names are defined in table 1.

For X1, the top event may be caused by either the failure of the personal computer or the failures of both the two bank servers, whose normal working conditions both depend on the power supply service. Once the local power cannot be supplied, UPS will continue to provide the power a period of time long enough. For X2, the top event will happen if all three terminals cannot be used (may due to the hardware reason or being unavailable of all tellers in the bank) or there are some problems with the two servers. For X3, since the system manager can work on the servers directly, the occurrence of the top event is simple to analyze. Based on FIG. 8, both XI and X2 include two parts, one is a static part in the dotted circle on the left, the other is a dynamic part in the dotted circle on the right shown in FIGS. 8 (a) and (b); X3 is only composed of one dynamic part. After considering all shared events among these parts, we combine all related dynamic parts to obtain one module, and combine all non-related static parts to obtain another module. For the new-formed dynamic module, we use MC shown in FIG. 9 and the corresponding ET shown in FIG. 10 to explain the details of our idea.

TABLE 1

Basic Event Names

| Symbol | Definition |
| --- | --- |
| p | personal computer of the customer |
| T | terminal in the bank |
| A/B | primary/backup server in the bank |
| D | local power supply service |
| E | backup power supply service in the bank |
| F | UPS for the customer's computer |

FIG. 9 shows the MC of the dynamic module, which involves all related parts, including shared events A, B, D, E and F. Since this MC is affected by all three subsystems, we use three bits to indicate the UP or DOWN status for these subsystems respectively, with "0" meaning UP and "1" meaning DOWN. For instance, "100" means X1 is down while both X2 and X3 are up. From FIG. 9, there are totally three different groups of states (000, 100 and I11). Any other results (e.g. 011, 001) are impossible otherwise there should exist some contradictions. With such a 3-bit vector, all branches of the ET can be efficiently obtained, whose results are shown in FIG. 10 ("0" branches are those impossible to appear).

Figure 11:
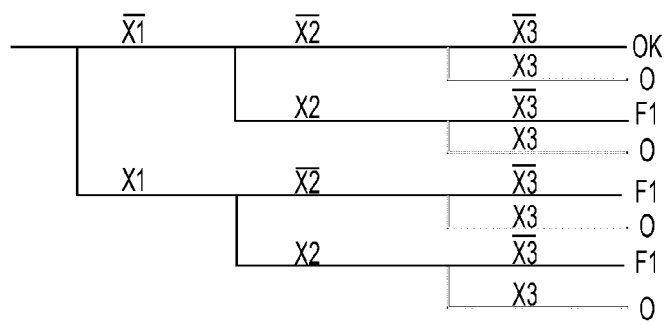
FIG. 11 depicts the ET (Event Tree) for the static module.

Following the same way, we can obtain the equivalent ET for the static module shown in FIG. 11. Based on FIG. 8, X3 has no static units then is unrelated to the static module; but it has also been included in this ET, so that the two ET structures of dynamic and static modules are the same then we can easily compare their each corresponding branch to get a final ET for the whole system. Also, because X3 has no static units, there is no chance to let X3 down in this static module, so any branch going along "X3" should be impossible. We use "0" to represent such case in FIG. 11. The final results for the whole system ET are formed after combining the two ETs of FIGS. 10 and 11, listed in table 2. Three end points are impossible to appear, which implies that once the third way fails to access the bank account (X3 occurs), there is no possibility to reach the goal by other two ways.

TABLE 2

The Results of ET

| Mark | All Results | | | | | | | |
| --- | --- | --- | --- | --- | --- | --- | --- | --- |
| Up/Down | 000 | 001 | 010 | 011 | 100 | 101 | 110 | 111 |
| Impossible | | X | | X | | X | | |

We need note that the MC in FIG. 9 is a little different from those used in previous systems, because the letter (e.g. A, B) of each state in a traditional MC represents that the corresponding event/component is available. While in our example, the letter in each state represents the actual operational physical situation of the corresponding event/component. For example, in subsystem XI, the failures of D and F will lead to the unavailability of both "A" and "B". We use "AB-E-" to represent the state in our current MC rather than use "---E-" to represent such state in a traditional MC. The reason is that one unavailable event in one subsystem, may be still available for another subsystem due to different causes. Since we only construct one MC for all related dynamic units in this example (they are grouped into one module), it is not reasonable to represent such an event by simply using a symbol "-".

Detailed Description of Results

Introduction

In this section ("Detailed Description of Results"), we discuss the theoretical and practical implementations of integrating the Dynamic Fault Tree (DFT) model into an Event Tree (ET) based risk assessment methodology. Dynamic Fault Trees (DFT) use FDEP, SPARE and PAND gates to link their subsystem of events as depicted in FIGS. 17, 18 and 19. Event Trees include complex super systems of events. ET are often combined with (static) fault trees (SFT) as part of a PRA (Probabilistic Risk Assessment) methodology. Static Fault Trees (SFT) use, e.g., AND, OR and N/K gates to link their sub system of events as depicted in FIG. 12. Generally, SFT are used to quantify branch points (also called pivot points) in the ET. In the present application, among other things, the present inventors propose to use DFT (dynamic fault trees) instead of SFT for ET branch points. The DFT model allows, among other things, the consideration of dependencies between events and is well suited for the analysis of computer-based systems.

Background and Assumptions

Static Models

Event trees and static fault trees are logically equivalent combinatorial models [see, e.g., Ref. B1, listed above]. This means that both can be represented using Boolean structure functions, and thus probability calculations are well defined. ETA and FTA, in their simplest forms, can be reduced to determining the probability of an event which can be expressed as a logical combination of Boolean indicator variables for components. Both ETA and FTA can be performed using cutest (see, e.g., FIG. 15 for the definition of cutest)-based algorithms (e.g., MOCUS, Inclusion/Exclusion, Sum of Disjoint Products) or BDD (Binary Decision Diagrams).

| Table of Acronyms Acronyms | |
|---|---|
| BDD | Binary Decision Diagram |
| CCF | Common Cause Failures |
| DFT | Dynamic Fault tree |
| ET | Event Tree |
| ETA | Event Tree Analysis |
| FTA | Fault Tree Analysis |
| IPCM | Imperfect Coverage |
| MPS | Multi-Phase System |
| PRA | Probabilistic Risk Assessment |
| SFT | Static Fault Tree |

The logical equivalence of ET and SFT also means that it is straightforward to convert an ET to an equivalent SFT and vice versa. Further, the use of SFT to represent branching events in an ET is mathematically consistent. In fact, ET events and SFT events can be arbitrarily mixed within the same model.

Dynamic Models

Dynamic fault trees involve a generalization of static models. In a static model, the structure function is combinatorial. This means the structure function can be expressed as a logical combination (using AND, OR and NOT) of basic events. The order of occurrence of the basic events is inconsequential; one only needs to know whether the event has occurred to determine whether the output event has occurred. The DFT, however, allows the output event to depend on the order in which events occur. The same set of events may cause system failure if they occur in one order and may not cause system failure if they occur in a different order. DFT analysis requires the consideration of the rates at which events occur, as well as whether they have occurred at all. DFT analysis is typically performed using Markov chains.

The DFT and static models are not inconsistent. A static (combinatorial) model with exponential times to failure can be solved using Markov models [see Ref. B2, listed above]; however, dynamic models cannot be analyzed using only Boolean algebraic approaches (e.g., I/E, SDP, BDD). That is, static models can generally be solved using DFT approaches, while the converse is not true. However, under certain conditions, Markov analysis can be combined with combinatorial approaches; a Markov model can be used to describe an event in a fault tree for example.

Combining ET and SFT

In its simplest form, with fixed probabilities associated with branching events, the ET is evaluated by considering the paths emanating from the initialing event. If there are n branching points in an ET, there are paths to be considered, each corresponding to one combination of assignments (true, false) to the n variables. A path then represents the logical AND of events that occur (where the associated variable is true) and a set of events that do not occur (where the associated variable is false). The events in an ET are often called "branch points" or "pivot points." See, e.g., FIG. 20.

Each path is labeled as to its outcome, for example system failure mode 1 (F1) or system failure mode 2 (F2). Some paths lead to successful system operation (OK) as well. More than one path may lead to the same outcome. The ET is analyzed by considering the logical OR of each path of all three pivot events (X1, X2 and X3) occur. Failure event F1 occurs when X3 occurs, as long as X2 does not occur. The events in an ET may be generalized from single events to more complex events which are in turn logical combinations of other events. That is, the pivot point of an event tree can be the top event of a fault tree, which is in itself a logical combination (AND, OR) of its constituent events. Because both the ET and FT use logical operations, their combination is well defined. In the example ET, the events X1, X2 and X3 may be the top events of fault trees. The fault trees may then represent logical functions of other events. A path in the event tree is the logical AND of the top events of the fault trees (possibly negated) associated with the pivot points. Thus, the function associated with a leaf node in an ET can be expressed as a logic function of the basic events in the associated fault trees.

Since both ET and FT represent Boolean structure functions, conversion between model types and composition of models of different types are well defined mathematically. In fact Reliability Block Diagrams (RBD) are also models in the same class [see, e.g., B1 listed above], representing Boolean structure functions and thus can be similarly combined with ET and FT.

Coherence

The structure function for a fault tree is usually a coherent function, that is, monotonic in all variables. The practical implication of a coherent structure function is that a component failure cannot cause a failed system to become operational. A coherent structure function can be adequately represented by its cutsets, which are the sets of events which, when they all occur, cause the top event Cutsets always contain events that represent component failure, never events that represent component non-failure. Fault trees composed of only AND, OR and K/M gates always result in coherent structure functions.

Event trees explicitly contain paths that represent combinations of both positive and negative events, thus it cannot be assumed that the structure functions associated with an ET is coherent. Further, even if all the FT nodes used as pivot nodes in an ET are coherent, the resulting structure function of the combination is not necessarily coherent.

Non-coherent models can be problematic when using cutset-based analysis techniques, but present no particular difficulty when using more general Boolean techniques, such as the BDD. That is, the BDD analysis approach handles non coherent models correctly.

Independence vs. Shared Events

When FT are used as ET pivot nodes, the ET becomes a logical function of the basic events in the FT. If the sets of basic events in each FT are mutually disjoint, then the pivot nodes are all mutually independent. ET analysis can then involve the separate analysis of each FT, using the probability of the top event as the probability of the pivot node. In the ET shown in FIG. 20, suppose that the events X1, X2 and X3 are the top events of fault trees, and that there are no basic events that appear in more than one of these fault trees. Then, the three fault trees can be solved separately for the probabilities of the events X1, X2 and X3. This set of probabilities and their complements, can be inserted into the ET solution. The basic events that contribute to the events X1, X2 and X3 need not be considered in the solution of the ET.

However, if there are basic events that are common to two or more of the fault trees used as pivot nodes along the path, then the analysis is more complicated. Instead of separate analysis of each fault tree, each of the fault trees along a path must be considered together. Consider the path (X1, X2, X3) in the ET shown in FIG. 20, which leads to the outcome F3. Since this is the only path leading to outcome F3, it can be considered in isolation. The logical expression representing the outcome F3=X1 AND X2 AND X3. The probability of the outcome F3 is then P(F3)=P(X1 X2 X3). Since X1, X2 and X3 represent the top events of fault trees (e.g., the complex super system of events), each can in turn be expressed as a logical function of its constituent events (e.g., its sub system of events).

If there is more than one path leading to an outcome, then the logical expressions for the paths leading to the same outcome are connected by the logical OR operation. Internal events (gate outputs) may be shared between pivot node fault trees as well as basic events.

For reference, Appendix A, infra, contains a detailed analysis of a static event tree with static fault tree pivot nodes with shared events.

Dynamic Fault Trees as Pivot Nodes
Independent DFT as Pivot Nodes

The use of dynamic fault trees to represent pivot nodes events is conceptually simple. In the case where there are no shared events, the independent DFT can be solved separately, using standard DFT analysis. A DFT for a pivot node can be modularized and solved via a combination of BDD and Markov models, and the resulting probability of the top event can be used in the ET analysis. The DFT model can therefore be used to model sequential dependencies between components that affect the outcome of one pivot event. This analysis assumes that a single-phase mission is being analyzed.

DFT Pivot Nodes with Shared Events

If events are shared between pivot node DFT models, then the DFT models can no longer be solved separately. As in the case where the pivot FT are static, each path on the ET is evaluated by connecting the FT pivot node top events (possibly complemented) with the logical AND operation. If multiple paths lead to the same outcome, the logical expressions for each path are connected by a logical OR operation. Several issues are initially considered when DFT with shared events are used for pivot nodes in an ET, including:
1. What are the implications of AND'ing or OR'ing DFT, particularly with shared spares or constraints?
2. What does it mean to negate a DFT? DeMorgan's laws do not necessarily apply to dynamic gates or constraints.
3. How do we extend the AND and OR operations associated with an ET to the Markov models used for the solution of the DFT?
4. Can we avoid the generation of large Markov models by taking advantage of modularity? Does the Markov model generation or solution need to change to accommodate the consideration of more than one DFT on a path in the ET?

These issues have been identified and considered while analyzing several example systems. Illustrative results are presented in Reference B4 listed above and are summarized herein. In the remainder of this section, we discuss the first two, as they relate to logical operations on DFT. The latter two issues relate to the Markov model solution and are addressed in subsequent sections.

Logical Operations on DFT with Shared Events

To determine the probability of an outcome, the DFT models used to define the pivot events should be logically connected with an AND operation, as is done when the pivot nodes are defined using SFT. Conceptually, the AND of two DFT produces a third DFT, where the top nodes is an AND gate whose inputs are the top nodes of the DFT being combined. Since the AND gate is defined for DFT and the AND operation is well defined within the DFT framework, this combination is conceptually straightforward.

Similarly, the combination of DFT using the OR poses no conceptual difficulty.

If events are shared between the DFT being AND'ed or OR'ed, those events will then contribute to the outcome (e.g., the new top event) via multiple paths. The algorithms currently used to solve. DFT can accommodate such repeated events without difficulty. It may be beneficial to rearrange the events in the resulting DFT (while not changing the logical structure) to facilitate modularization and efficiency. Such rearrangement will not be needed for a correct solution, but may improve performance.

The dynamic gates within the separate DFT, such as spare gates or functional dependencies, should be consistent when the DFT are combined. For example, if there is a spare gate that labels B as a cold spare for A in one constituent DFT, and a spare gate that labels A as a warm spare for B, these contradictory assignments would be detected when the DFT are combined. GALILEO checks all DFT for validity and consistency before solution. The net effect of the validity checks will be the enforcement of consistency between the different DFT that are used to define the pivot nodes.

Negation of DFT

The negation (i.e., NOT operation) is not included within the DFT as currently defined, and so the effects of negation are carefully considered. Negation for SFT is clearly defined within the framework of Boolean Algebra, where DeMorgan's laws relate the negation of an operation with the negation of the inputs. DeMorgan's laws do not apply directly to DFT.

There are at least three different constructs to be considered with respect to negation. First, the interpretation of the negation of dynamic gates (e.g., spare gates and PAND) must be specified. Second, the negation operation when applied to constraints (such as, e.g., FDEP) must be defined. Third, the interpretation of negation to replicated basic events must also be considered. These definitions must be clearly and completely specified so as to be consistently applicable to all valid DFT.

In our example analyses [see Ref. B4 listed above] some rules for negation have been suggested. These suggestions will be further discussed herein. From initial results, we can extend negation to the DFT gates and constraint.

Negating DFT Gates

First, consider the spare gate. A spare gate defines several parameters to the model: the failure rate of the active component, the failure rate of the spare component, the order in which spares are used, the implications of sharing pools of spares, and the logical status of the spare set. This latter aspect, the logical output of the spare gate, is defined to be true when the primary and all of its spares have been used or have failed. It is to this logical aspect that the negation applies, and the other aspects remain unchanged. That is, the negation of a spare gate is the negation of the logical output of the gate. The other implications of the gate remain unchanged.

The negation of the PAND gate output can be analyzed using DeMorgan's law. A PAND gate with 2 inputs, A and B is true when both A and B have occurred and A occurred before B. The negation of the PAND can then be interpreted to mean that A did not occur, or B did not occur, or A occurred after B. The only ambiguity occurs when A and B occur simultaneously, and depends on the interpretation of the P AND of simultaneous events. If the PAND is true for simultaneous events, then the negation of PAND is not.

Negating DFT Constraints

Constraints in the DFT language refer to constructs that have no logical output but which affect events in the free. Currently defined constraints include the FDEP (functional dependency constraint) (see, e.g., FIG. 17), SEQ (Sequence Enforcing constraint) and CCG (common-cause group) (see, e.g., FIG. 19). FDEP propagates failures and is used when some components depend on others for their continued operation. SEQ enforces sequential ordering of events. CCG defines common cause groups, basic events that may be subject to common mode failures.

None of the constraints has a logical output, so negation is inconsequential. The effect of a constraint is the same before and after negation.

Non-Coherence

Including negation in a DFT model may result in a DFT that is no longer coherent. In fact, including negation in a SFT may also result in a model that is not coherent. Coherence impacts many facets of the solution of a DFT and must be considered carefully. The impact of non-coherence on BDD-based analysis appears to be less than the impact on BDD-based approaches [see Ref. B5 listed above]. A non-coherent DFT can result in a vast increase in the number of states needed in a Markov model. At this point, there are some complexities in identifying conditions under which a non-coherent model results from negation of a DFT, although there are situations in which we can be sure that a coherent model results.

Markov Chain Solution of ET with DFT Pivot Nodes

Initial results indicate that the use of DFT to define pivot nodes in static ET can be well defined and logically consistent. In this section, we consider issues related to the Markov chain analysis of DFT within the ET framework.

No Shared Events

When there are no shared events between any DFT being used as pivot nodes, each DFT can be solved separately as an independent Markov model. No changes to the ET or DFT established methodologies are needed. Non-coherence is not a problem in this case, since the probability of a negated DFT can be easily calculated from the probability of occurrence of the DFT top event. That is, negation can be performed in probability rather than in event space.

Shared Events

When events are shared between DFT being used as pivot nodes in an ET, the DFT are combined using logical operations (AND, OR and NOT) to produce a single DFT for each outcome. First, consider the case where there are only two possible outcomes, success and failure. The resulting DFT then represents one of the two outcomes (the other being the negation of the DFT). The DFT for the outcome can be solved using a combination of BDD and Markov model solutions, according to the standard modular approach for DFT. The standard approach should be expanded to support the NOT operation, with the careful consideration of non-coherence.

In the more general case, multiple outcomes are considered and multiple DFT models (one for each outcome) will be produced. These DFT will necessarily share events and their combined solution must be produced. The combined solution approach is described via example in Reference B4 listed above.

The approach in the preferred embodiments to the solution of ET with DFT pivot nodes is to construct a single Markov model whose single solution will simultaneously produce the probability of occurrence for each outcome. Generally, when using a Markov chain to solve a reliability model, each state in the model is labeled as to whether it represents a system configuration that is operational or failed. To achieve analysis of several outcomes represented by an event tree, we expand this label to be a vector of labels, one for each outcome. That is, each state is labeled as to whether or not each outcome is achieved. This approach is applied to an example in Reference B4 listed above and is not dissimilar to our approach to phased mission analysis using Markov models.

The proposed approach to solving a ET/DFT model requires some simple changes to our Markov chain generation approach. The models presented in Reference B4 listed above were solved manually (general algorithms did not yet exist). A fully developed approach may be influenced, e.g., experiences with phased mission analysis.

Modular Solution

An important feature of the DFT solution approach is the automatic decomposition of the DFT into independent modules which can be solved separately. The modules can be solved using different solution techniques, as appropriate. Modularization can result in tremendous improvements in efficiency and accuracy, and is described in Reference B3 listed above. Modularization is well defined for single phase DFT, and has recently been extended to multi-phase systems as well [see Reference B6 listed above], but had not previously been explored within the context of ETA.

Detecting modules in a DFT that represents a multi-phase system or that results from an ET-DFT model is considerably more difficult than detecting modules in a standard single-phase DFT. These latter two DFT models (referred to herein as a compound DFT) are composed of DFT sub-models using many of the same basic events. The modularization process for compound DFT generally involves detecting modules in each constituent DFT (e.g., the separate DFT for each phase or ET outcome) and then combining the modules together again to form modularized compound DFT.

Although the approach to modularizing phased mission DFT is not directly applicable to ET-DFT models, the approaches will likely be similar. Appendix B contains an example analysis that illustrates a basic approach of modular solution. This approach has been implemented manually and can be further developed based on this disclosure.

Summary and Conclusions

Initial results show that the integration of DFT into static ETA is not only feasible, it could greatly extend the modeling capability of the ET. A number of notable issues have been discussed, including the logical definition and interpretation Of the Model, model solution, and modularization. A short summary of some of the findings is given below:

ET-DFT integration (from a modeling perspective) is relatively straight forward when the pivot node DFT are independent (i.e., do not share events).

Sharing events across pivot nodes requires the construction and solution of a compound-DFT, which is the logical combination of several DFT models for different outcomes.

Logical combinations of DFT appear to be mathematically consistent with the rules of Boolean algebra.

ET-DFT construction may result in non-coherent models (even if all the constituent DFT models are coherent) and care must be exercised in their analysis.

Algorithms for generation of Markov models for the analysis compound-DFT can be further developed based on those algorithms used for analysis of DFT.

Modularization algorithms can be further developed and can provide potential improvements in efficiency and accuracy.

APPENDIX A

An Example ET with Static FT Pivot Nodes

Figure 14:
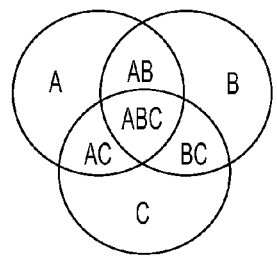
FIG. 14 gives a graphical representation of inclusion/exclusion analysis for the probability P(A u B u C).

This appendix shows an illustrative detailed analysis of the event tree shown in FIG. 20 of the report. It shows, by way of the example, the analysis process used for ETA. For the sake of illustration, both the IE (Inclusion/Exclusion) (see, e.g., FIG. 14) and BDD (Binary Decision Diagram) (see, e.g., FIG. 16) approaches are illustrated for different parts of the model.

Here is a simple hypothetical example of ET, the fault tree structures of whose three pivot events are shown in FIG. 20 of the main report, reproduced here for the sake of clarity. FIG. 21 shows the fault tree nodes associated with the pivot nodes X1, X2 and X3.

According to Boolean algebra, the logic functions of the top events associated to three fault trees are as follows.

$$X1 = A + BC \tag{1}$$

$$X2 = D + BE \tag{2}$$

$$X3 = F + BE \tag{3}$$

$$\overline{X1} = \overline{A+BC} = \overline{A} \cdot (\overline{B} + \overline{C}) = \overline{A} \cdot \overline{B} + \overline{A} \cdot \overline{C} \tag{4}$$

$$\overline{X2} = \overline{D+BE} = \overline{D} \cdot (\overline{B} + \overline{E}) = \overline{D} \cdot \overline{B} + \overline{D} \cdot \overline{E} \tag{5}$$

$$\overline{X3} = \overline{F+BE} = \overline{F} \cdot (\overline{B} + \overline{E}) = \overline{F} \cdot \overline{B} + \overline{F} \cdot \overline{E} \tag{6}$$

Therefore, each of the eight outcomes of the all paths are obtained by ANDING all pivot events along the path. The logical functions of these outcomes are listed below.

$$F(outcome_1) = \overline{X1} \cdot \overline{X2} \cdot \overline{X3} \tag{7}$$
$$= [\overline{A} \cdot \overline{B} + \overline{A} \cdot \overline{C}][\overline{D} \cdot \overline{B} + \overline{D} \cdot \overline{E}][\overline{F} \cdot \overline{B} + \overline{F} \cdot \overline{E}]$$
$$= \overline{A} \cdot \overline{D} \cdot \overline{F} \cdot \overline{B} + \overline{A} \cdot \overline{D} \cdot \overline{F} \cdot \overline{C} \cdot \overline{E}$$

$$F(outcome_2) = \overline{X1} \cdot \overline{X2} \cdot X3 \tag{8}$$
$$= [\overline{A} \cdot \overline{B} + \overline{A} \cdot \overline{C}][\overline{D} \cdot \overline{B} + \overline{D} \cdot \overline{E}][F + BE]$$
$$= \overline{A} \cdot \overline{D} \cdot F \cdot \overline{B} + \overline{A} \cdot \overline{D} \cdot F \cdot \overline{C} \cdot \overline{E}$$

$$F(outcome_3) = \overline{X1} \cdot X2 \cdot \overline{X3} \tag{9}$$
$$= [\overline{A} \cdot \overline{B} + \overline{A} \cdot \overline{C}][D + BE][\overline{F} \cdot \overline{B} + \overline{F} \cdot \overline{E}]$$
$$= \overline{A} \cdot D \cdot \overline{F} \cdot \overline{B} + \overline{A} \cdot D \cdot \overline{F} \cdot \overline{C} \cdot \overline{E}$$

$$F(outcome_4) = \overline{X1} \cdot X2 \cdot X3 \tag{10}$$
$$= [\overline{A} \cdot \overline{B} + \overline{A} \cdot \overline{C}][D + BE][F + BE]$$
$$= \overline{A} \cdot D \cdot F \cdot \overline{B} + \overline{A} \cdot D \cdot F \cdot \overline{C} + \overline{A} \cdot B \cdot \overline{C} \cdot E$$

$$F(outcome_5) = X1 \cdot \overline{X2} \cdot \overline{X3} \tag{11}$$
$$= [A + BC][\overline{D} \cdot \overline{B} + \overline{D} \cdot \overline{E}][\overline{F} \cdot \overline{B} + \overline{F} \cdot \overline{E}]$$
$$= A \cdot \overline{D} \cdot \overline{F} \cdot \overline{B} + A \cdot \overline{D} \cdot \overline{F} \cdot \overline{E} + \overline{D} \cdot \overline{F} \cdot B \cdot C \cdot \overline{E}$$

$$F(outcome_6) = X1 \cdot \overline{X2} \cdot X3 \tag{12}$$
$$= [A + BC][\overline{D} \cdot \overline{B} + \overline{D} \cdot \overline{E}][F + BE]$$
$$= A \cdot \overline{D} \cdot F \cdot \overline{B} + A \cdot \overline{D} \cdot F \cdot \overline{E} + \overline{D} \cdot F \cdot B \cdot C \cdot \overline{E}$$

$$F(outcome_7) = X1 \cdot X2 \cdot \overline{X3} \tag{13}$$
$$= [A + BC][D + BE][\overline{F} \cdot \overline{B} + \overline{F} \cdot \overline{E}]$$
$$= A \cdot D \cdot \overline{F} \cdot \overline{B} + A \cdot D \cdot \overline{F} \cdot \overline{E} + D \cdot \overline{F} \cdot B \cdot C \cdot \overline{E}$$

$$F(outcome_8) = X1 \cdot X2 \cdot X3 \tag{14}$$
$$= [A + BC][D + BE][F + BE]$$
$$= A \cdot D \cdot F + D \cdot F \cdot B \cdot C + A \cdot B \cdot E + B \cdot C \cdot E$$

Assuming, e.g., the failure probability of each outcome is fixed value of 0.2, then the corresponding success probability is 0.8. In the following paragraphs, two different approaches will be used to show the whole evaluation process. One is Inclusion Exclusion Expansion (IE) (see, e.g., FIG. 14); the other is Binary Decision Diagram (BDD) (see, e.g., FIG. 16).

Using IE (Inclusion/Exclusion)

$$Pr\{outcome_1\} = Pr\{\overline{X1} \cdot \overline{X2} \cdot \overline{X3}\} \tag{15}$$
$$= Pr\{\overline{A} \cdot \overline{D} \cdot \overline{F} \cdot \overline{B} + \overline{A} \cdot \overline{D} \cdot \overline{F} \cdot \overline{C} \cdot \overline{E}\}$$
$$= Pr\{\overline{A} \cdot \overline{D} \cdot \overline{F} \cdot \overline{B}\} + Pr\{\overline{A} \cdot \overline{D} \cdot \overline{F} \cdot \overline{C} \cdot \overline{E}\} -$$
$$Pr\{\overline{A} \cdot \overline{D} \cdot \overline{F} \cdot \overline{B} \cdot \overline{C} \cdot \overline{E}\}$$
$$= (0.8)^4 + (0.8)^5 - (0.8)^6$$
$$= 0.475136$$

$$Pr\{outcome_2\} = Pr\{\overline{X1} \cdot \overline{X2} \cdot X3\} \tag{16}$$
$$= Pr\{\overline{A} \cdot \overline{D} \cdot F \cdot \overline{B} + \overline{A} \cdot \overline{D} \cdot F \cdot \overline{C} \cdot \overline{E}\}$$
$$= Pr\{\overline{A} \cdot \overline{D} \cdot F \cdot \overline{B}\} + Pr\{\overline{A} \cdot \overline{D} \cdot F \cdot \overline{C} \cdot \overline{E}\} -$$
$$Pr\{\overline{A} \cdot \overline{D} \cdot F \cdot \overline{B} \cdot \overline{C} \cdot \overline{E}\}$$
$$= (0.8)^3 \cdot (0.2) + (0.8)^4 \cdot (0.2) - (0.8)^5 \cdot (0.2)$$
$$= 0.118784$$

$$Pr\{outcome_3\} = Pr\{\overline{X1} \cdot X2 \cdot \overline{X3}\} \tag{17}$$
$$= Pr\{\overline{A} \cdot D \cdot \overline{F} \cdot \overline{B} + \overline{A} \cdot D \cdot \overline{F} \cdot \overline{C} \cdot \overline{E}\}$$
$$= Pr\{\overline{A} \cdot D \cdot \overline{F} \cdot \overline{B}\} + Pr\{\overline{A} \cdot D \cdot \overline{F} \cdot \overline{C} \cdot \overline{E}\} -$$
$$Pr\{\overline{A} \cdot D \cdot \overline{F} \cdot \overline{B} \cdot \overline{C} \cdot \overline{E}\}$$
$$= (0.8)^3 \cdot (0.2) + (0.8)^4 \cdot (0.2) - (0.8)^5 \cdot (0.2)$$
$$= 0.118784$$

$$Pr\{outcome_4\} = Pr\{\overline{X1} \cdot X2 \cdot X3\} \tag{18}$$
$$= Pr\{\overline{A} \cdot D \cdot F \cdot \overline{B} + \overline{A} \cdot D \cdot F \cdot \overline{C} + \overline{A} \cdot B \cdot \overline{C} \cdot E\}$$
$$= Pr\{\overline{A} \cdot D \cdot F \cdot \overline{B}\} + Pr\{\overline{A} \cdot D \cdot F \cdot \overline{C}\} +$$
$$Pr\{\overline{A} \cdot B \cdot \overline{C} \cdot E\} - Pr\{\overline{A} \cdot D \cdot F \cdot \overline{B} \cdot \overline{C}\} -$$
$$Pr\{\overline{A} \cdot D \cdot F \cdot B \cdot \overline{C} \cdot E\}$$
$$= (0.8)^2 \cdot (0.2)^2 \times 3 - (0.8)^3 \cdot (0.2)^2 -$$
$$(0.8)^2 \cdot (0.2)^4$$
$$= 0.055296$$

$$Pr\{outcome_5\} = Pr\{X1 \cdot \overline{X2} \cdot \overline{X3}\} \tag{19}$$
$$= Pr\{A \cdot \overline{D} \cdot \overline{F} \cdot \overline{B} + A \cdot \overline{D} \cdot \overline{F} \cdot \overline{E} + \overline{D} \cdot \overline{F} \cdot B \cdot C \cdot \overline{E}\}$$
$$= Pr\{A \cdot \overline{D} \cdot \overline{F} \cdot \overline{B}\} + Pr\{A \cdot \overline{D} \cdot \overline{F} \cdot \overline{E}\} +$$
$$Pr\{\overline{D} \cdot \overline{F} \cdot B \cdot C \cdot \overline{E}\} - Pr\{A \cdot \overline{D} \cdot \overline{F} \cdot \overline{B} \cdot \overline{E}\} -$$
$$Pr\{A \cdot \overline{D} \cdot \overline{F} \cdot \overline{E} \cdot B \cdot C\}$$
$$= (0.8)^3 \cdot (0.2) \times 2 + (0.8)^3 \cdot (0.2)^2 -$$
$$(0.8)^4 \cdot (0.2) - (0.8)^3 \cdot (0.2)^3$$
$$= 0.139264$$

-continued $$Pr\{outcome_6\} = Pr\{X1 \cdot \overline{X2} \cdot X3\} \quad (20)$$
$$= Pr\{A \cdot \overline{D} \cdot F \cdot \overline{B} + A \cdot \overline{D} \cdot F \cdot \overline{E} + \overline{D} \cdot F \cdot B \cdot C \cdot \overline{E}\}$$
$$= Pr\{A \cdot \overline{D} \cdot F \cdot \overline{B}\} + Pr\{A \cdot \overline{D} \cdot F \cdot \overline{E}\} +$$
$$Pr\{\overline{D} \cdot F \cdot B \cdot C \cdot \overline{E}\} - Pr\{A \cdot \overline{D} \cdot F \cdot \overline{B} \cdot \overline{E}\} -$$
$$Pr\{A \cdot \overline{D} \cdot F \cdot \overline{E} \cdot B \cdot C\}$$
$$= (0.8)^2 \cdot (0.2)^2 \times 2 + (0.8)^2 \cdot (0.2)^3 -$$
$$(0.8)^3 \cdot (0.2)^3 - (0.8)^2 \cdot (0.2)^4$$
$$= 0.034816$$

$$Pr\{outcome_7\} = Pr\{X1 \cdot X2 \cdot \overline{X3}\} \quad (21)$$
$$= Pr\{A \cdot D \cdot \overline{F} \cdot \overline{B} + A \cdot D \cdot \overline{F} \cdot \overline{E} + \overline{D} \cdot \overline{F} \cdot B \cdot C \cdot \overline{E}\}$$
$$= Pr\{A \cdot D \cdot \overline{F} \cdot \overline{B}\} + Pr\{A \cdot D \cdot \overline{F} \cdot \overline{E}\} +$$
$$Pr\{\overline{D} \cdot \overline{F} \cdot B \cdot C \cdot \overline{E}\} - Pr\{A \cdot D \cdot \overline{F} \cdot \overline{B} \cdot \overline{E}\} -$$
$$Pr\{A \cdot D \cdot \overline{F} \cdot B \cdot C \cdot \overline{E}\}$$
$$= (0.8)^2 \cdot (0.2)^2 \times 2 + (0.8)^2 \cdot (0.2)^3 -$$
$$(0.8)^3 \cdot (0.2)^3 - (0.8)^2 \cdot (0.2)^4$$
$$= 0.034816$$

$$Pr\{outcome_8\} = Pr\{X1 \cdot X2 \cdot X3\} \quad (22)$$
$$= Pr\{A \cdot D \cdot F + D \cdot F \cdot B \cdot C + A \cdot B \cdot E + B \cdot C \cdot E\}$$
$$= Pr\{A \cdot D \cdot F\} + Pr\{D \cdot F \cdot B \cdot C\} +$$
$$Pr\{A \cdot B \cdot E\} + Pr\{B \cdot C \cdot E\} -$$
$$Pr\{A \cdot D \cdot F \cdot B \cdot C\} - Pr\{A \cdot D \cdot F \cdot B \cdot E\} -$$
$$Pr\{A \cdot D \cdot F \cdot B \cdot C \cdot E\} - Pr\{A \cdot D \cdot F \cdot B \cdot C \cdot E\} -$$
$$Pr\{D \cdot F \cdot B \cdot C \cdot E\} - Pr\{A \cdot B \cdot C \cdot E\} +$$
$$Pr\{A \cdot D \cdot F \cdot B \cdot C \cdot E\} \times 4 -$$
$$Pr\{A \cdot D \cdot F \cdot B \cdot C \cdot E\}$$
$$= (0.2)^3 \times 3 + (0.2)^4 - (0.2)^5 \times 3 -$$
$$(0.2)^6 \times 2 - (0.2)^4 + (0.2)^6 \times 4 -$$
$$(0.2)^6$$
$$= 0.023104$$

Using BDD (Binary Decision Diagram)

A major idea of BDD-based approach is to analyze the BDD of each outcome, which is obtained by combining BDD structures with dual BDD (DBDD) structures of all involved pivot events along a certain path in ET. The DBDD is converted from associated BDD via De Morgan's Laws. FIG. 22 shows all BDD and DBDD structures of X1, X2 and X3. In this example, the variable (basic event) order is supposed to be A<D<F<B<C<E.

In FIG. 22, each node represents a basic event from the fault tree and has two paths, including a 1 branch and a 0 branch which indicate the failure occurrence and non-occurrence of the basic event respectively. Paths through the BDD leading to terminal node 1 specify the conditions for the fault tree top event to occur (positive), while paths through DBDD leading to terminal node 1 represent the top event non-occurrence (negative).

Figure 23:
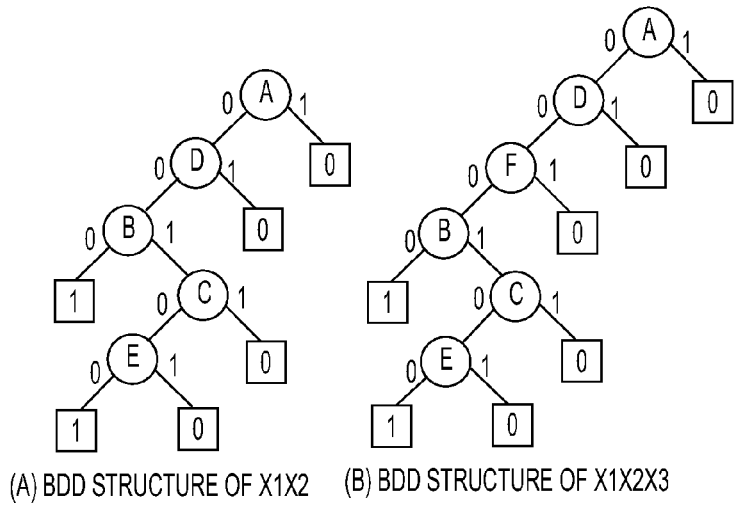
FIG. 23 depicts the BDD structure of outcome.

In order to obtain the BDD of all outcomes in ET, different combinations of these BDD and DBDD are required. For example, the BDD structure of outcome, $\overline{X1} \cdot \overline{X2} \cdot \overline{X3}$ can be obtained by ANDING DBDD structures of X1, X2 and X3. FIG. 23 illustrates the combination process.

Due to BDD characteristic that all binary branching paths in the diagram are mutually exclusive, the probability of system failure can be obtained by simply summing the probability of each disjoint path leading to a terminal node 1. The probability of each disjoint path is the probability of the combination of the basic events (success or failure) represented by the path. For example, the probability calculation of outcome, is shown in equation (23).

$$Pr\{outcome_1\} = Pr\{path_1\} + Pr\{path_2\} \quad (23)$$
$$= Pr\{\overline{A} \cdot \overline{D} \cdot \overline{F} \cdot \overline{B}\} + Pr\{\overline{A} \cdot \overline{D} \cdot \overline{F} \cdot B \cdot \overline{C} \cdot \overline{E}\}$$
$$= (0.8)^4 + (0.8)^5(0.2)$$
$$= 0.475136$$

This result is the same as that obtained in equation (15). It is obvious that the calculation process of BDD-based approach is much clearer and conciser than IE-based approach. Following similar process, all other outcomes can be quantified. Table A1 lists all the results.

TABLE A1

Calculation results of all outcomes of ET

| Case # | Logic function for each path | Logic function for each outcome | Probability of each outcome Using IE | Probability of each outcome Using BDD |
|---|---|---|---|---|
| 1 | $\overline{X1} \cdot \overline{X2} \cdot \overline{X3}$ | $\overline{A} \cdot \overline{D} \cdot \overline{F} \cdot \overline{B} +$ $\overline{A} \cdot \overline{D} \cdot \overline{F} \cdot \overline{C} \cdot \overline{E}$ | 0.475136 | 0.475136 |
| 2 | $\overline{X1} \cdot \overline{X2} \cdot X3$ | $\overline{A} \cdot \overline{D} \cdot F \cdot \overline{B} +$ $\overline{A} \cdot \overline{D} \cdot F \cdot \overline{C} \cdot \overline{E}$ | 0.118784 | 0.118784 |
| 3 | $\overline{X1} \cdot X2 \cdot \overline{X3}$ | $\overline{A} \cdot D \cdot \overline{F} \cdot \overline{B} +$ $\overline{A} \cdot D \cdot \overline{F} \cdot \overline{C} \cdot \overline{E}$ | 0.118784 | 0.118784 |
| 4 | $\overline{X1} \cdot X2 \cdot X3$ | $\overline{A} \cdot D \cdot F \cdot \overline{B} +$ $\overline{A} \cdot D \cdot F \cdot \overline{C} +$ $\overline{A} \cdot B \cdot \overline{C} \cdot E$ | 0.055296 | 0.055296 |
| 5 | $X1 \cdot \overline{X2} \cdot \overline{X3}$ | $A \cdot \overline{D} \cdot \overline{F} \cdot \overline{B} +$ $A \cdot \overline{D} \cdot \overline{F} \cdot \overline{E} +$ $\overline{D} \cdot \overline{F} \cdot B \cdot C \cdot \overline{E}$ | 0.139264 | 0.139264 |
| 6 | $X1 \cdot \overline{X2} \cdot X3$ | $A \cdot \overline{D} \cdot F \cdot \overline{B} +$ $A \cdot \overline{D} \cdot F \cdot \overline{E} +$ $\overline{D} \cdot F \cdot B \cdot C \cdot \overline{E}$ | 0.034816 | 0.034816 |
| 7 | $X1 \cdot X2 \cdot \overline{X3}$ | $A \cdot D \cdot \overline{F} \cdot \overline{B} +$ $A \cdot D \cdot \overline{F} \cdot \overline{E} +$ $D \cdot \overline{F} \cdot B \cdot C \cdot \overline{E}$ | 0.034816 | 0.034816 |
| 8 | $X1 \cdot X2 \cdot X3$ | $A \cdot D \cdot F + D \cdot$ $F \cdot B \cdot C + A \cdot$ $B \cdot E + B \cdot C \cdot E$ | 0.023104 | 0.023104 |
| Sum | | | 1 | 1 |

APPENDIX B

Applying Modularization in Combining Dynamic Fault Trees and Event Trees

In combining dynamic fault trees (DFT) and event trees (ET), we consider the case that the branch points of an ET are represented by DFT, and that there are some shared events among different branch points. In order to get all possible end points or outcomes of the ET, we need first analyze all branch points along all paths, which can be resolved through Markov Chain (MC) based method. Since one major disadvantage of MC is the state-space explosion problem, we must avoid this problem. In our current work, we use modularization [see, e.g., Refs. C1, C2 and C3], an efficient methodology to solve the problem, which is illustrated via a modified example based on a real example from NASA's space shuttle probabilistic risk assessment notebook.

Introduction

Figure 24:
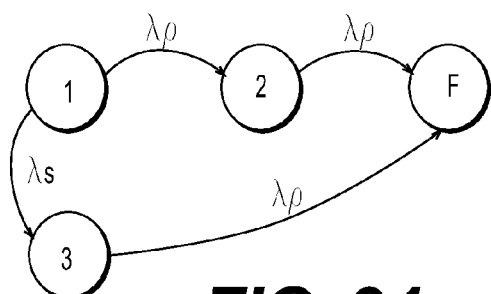
FIG. 24 depicts a Markov Chain for a standby system.

For a dynamic system, in which both the combinatorial relationships and the failure sequences, functional dependencies, and stand-by spares need take into account: MC (Markov Chain) has been used to efficiently keep track of the dynamic history of the system in terms of states and finally solve the whole system [see Ref. C4 listed above]. For example, FIG. 24 gives the MC for a standby system. The system has three components, including a primary unit being operational, a backup unit being standby and a switch used to switch from the primary unit to the backup one if the primary one fails. State 1, 2, 3 and represent all different system status, with state 1 representing the original status that all three components are in good condition, state 2 and 3 representing the intermediate, status that the primary unit fails first and the switch fails first, respectively, and state representing the system failure status.

However, a major problem of any state-based Modeling such as MC is the state space explosion problem, which negatively affects both the MC constructing time and solving time. On the other side, many systems especially safety-critical systems inevitably contain numerous states. The two facts tell us it is necessary to find a new way or use an existing approach to avoid the state space explosion problem. Fortunately, modularity, an important concept that has been widely used in diverse fields has also efficiently been adopted in fault tree analysis [see Ref. C2 listed above].

We introduce previous idea of modularity for a single FT below. Then, we extend the method to multiple FT in ET analysis in the next section. Then, in the next section, we give an example to illustrate the benefit brought by this methodology. A conclusion is then drawn in the next section.

An Overview of Modularization

Modularity can be intuitively regarded as subdivision of a complex object into simpler and smaller objects. In this section, we will see how to apply this concept to a single static or dynamic fault tree.

Rauzy's Algorithm

Figure 25:
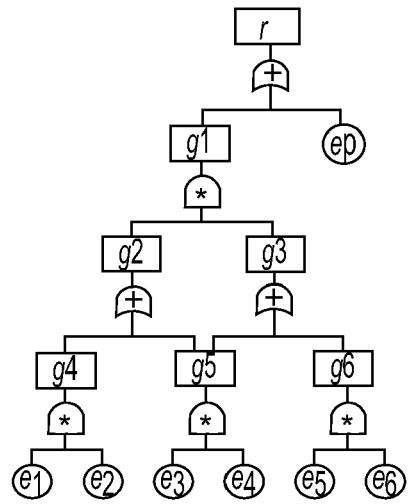
FIG. 25 depicts a simple fault tree for modularization.

An original algorithm to find the modules in fault trees was first proposed by Yves Dutuit and Antoine Rauzy [see Ref. C2 listed above], in which a Depth-First Left-Most traversal is performed. During the traversal, each node including gate and basic event is marked with the visiting orders in terms of a vector {first_order, second_order}. A node is an independent module if and only if its descendents are visited between first_order and second_order, the detail is illustrated in Reference C6 listed above. After this procedure, a large fault tree is decomposed into multiple independent smaller modules from up to down. Each module will be easily solved separately from bottom to top then to form the top event or system unreliability/reliability. This idea is shown by FIG. 25. In FIG. 25, there are one top event r, seven basic events from to $e_1$ to $e_7$, and six gates from $g_1$ to $g_6$. According to Rauzy's algorithm, the five independent modules are r, $g_1$, $g_4$, $g_5$ and $g_6$, while $g_2$ and $g_3$ are not modules because they are dependent on shared part $g_5$.

DIFtree Uses Modularization to Combine SFT and DFT

While the limitation of Rauzy's algorithm is that it only concentrates on static fault trees without considering dynamic systems, more information is needed to develop an algorithm for combining dynamic fault trees and event trees.

Figure 26:
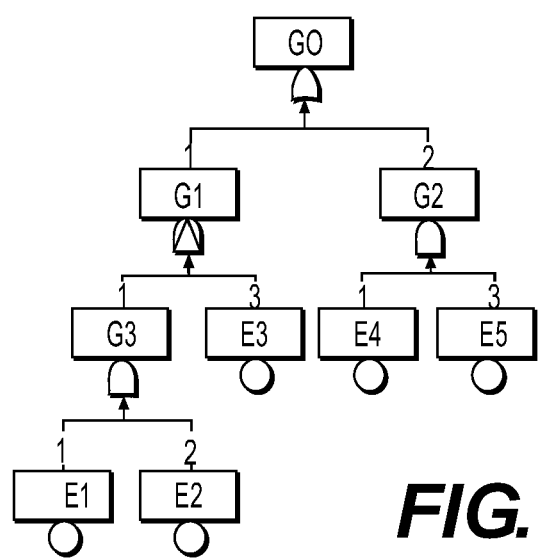
FIG. 26 depicts Modularizing a dynamic fault tree.

DIFtree (Dynamic Innovative Fault Tree), a software package for the analysis of dynamic fault tree models, is fully described in Reference C5 listed above, in which a dynamic subtree is treated as an indecomposable module by identifying whether the top gate of the subtree is a dynamic one. This is illustrated in FIG. 26. Finally, there are 3 modules: $G_0$, $G_1$ and $G_2$. While $G_3$ is ruled out the module list because it is embedded in the dynamic module $G_1$ which can not be decomposed any more. Thus, a general dynamic fault tree, either only including dynamic parts or including both dynamic and static parts, can be modularized using DIFtree in addition to Rauzy's algorithm.

Applying Modularization to Event Tree Analysis

In order to apply modularity method in the ET to get all possible end points, we analyze each point passing along a path. Since there exist some shared events across different branch points or exist dependencies among those points along one path, we cannot analyze each point independently. In this section, we introduce some new features of an ET then the way to apply modularization in ET analysis.

Modularization Concepts for Event Trees

Branch point—The branch points of an ET in this paper are not limited to basic events any longer, which are composed of some subsystems represented by FT.

Premodule—A module which is identified within one single branch point or subsystem is called a premodule, which is used to form module across several branch points.

Branch module—A branch module is created by incorporating all related premodules from all single branch points.

Direct Modularization on Branch Points

Figure 27:
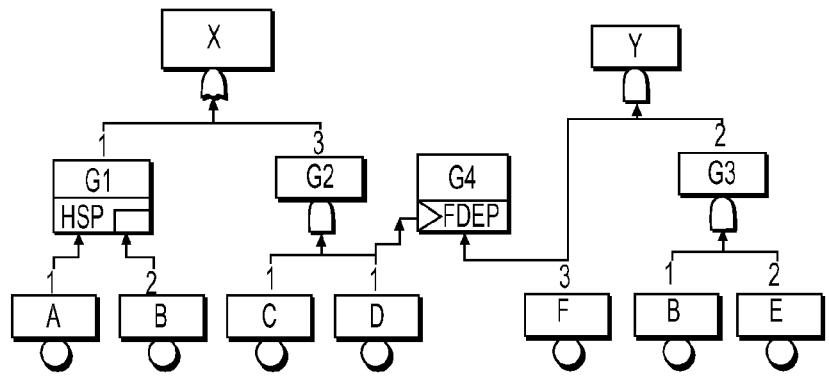
FIG. 27 depicts FT of two branch points of an ET.

Reference is made to FIG. 27. According to the concepts introduced above, four premodules are identified as $M_{x1}\{A, B\}$, $M_{x2}\{C, D\}$, $M_{y1}\{F\}$ and $M_{y2}\{B, E\}$. They are then used to form the branch modules by integrating all related premodules. The new branch modules are obtained as $M_1\{A, B, E\}$ and $M_2\{C, D, F\}$. In combining DFT and ET, all branch modules will be solved independently using BDD or MC based method, so that we can ultimately get all end points of the ET.

Indirect Modularization for Markov Models

The consequence of the direct modularization for different branch points or the FT is that it makes the following resolving process much simpler due to the indirect modularization of MC. On one side, we avoid constructing a separate MC for each branch point that would be a tedious and unreasonable work due to the dependencies caused by shared events; on the other side, we also avoid constructing a single MC for the whole system that would be terrible and not impractical due to the state-space explosion problem. The obvious effect of state space saving will be illustrated by an example later.

ILLUSTRATIVE EXAMPLE

APU Example Description

Figure 28:
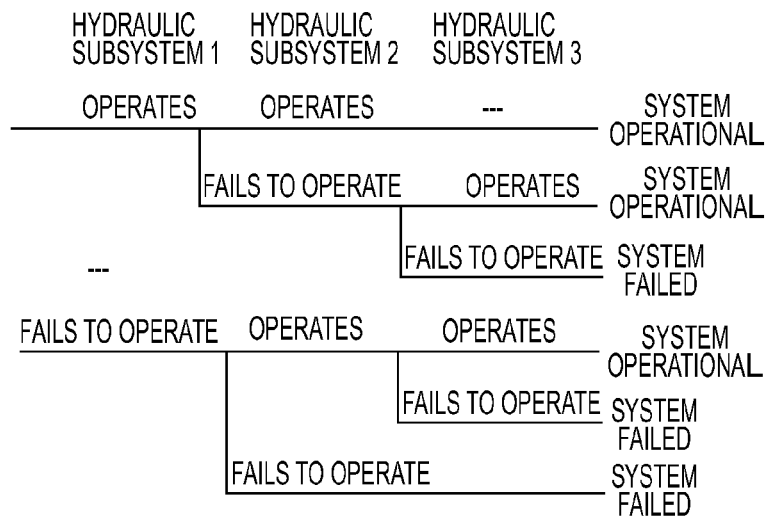
FIG. 28 depicts the ET of the hydraulic system.

As an example application of the modularization approach, we consider the auxiliary power unit system (APU) of space shuttle [see Ref. C7 listed above]. The Orbiter is equipped with three hydraulic systems to supply redundant power to all hydraulically driven components. Any of three systems is divided into three subsystems: 1) hydraulic power generation subsystem (HPGS), 2) water spray boiler (WSB), and 3) auxiliary power unit (APU). Each is required to maintain nominal hydraulic system performance. The function of the APU model is to serve as an integrating platform for the hydraulic and water boiler subsystems to assess the risk of losing hydraulic power on the space shuttle orbiter. This model is constructed such that the top event (loss of hydraulic power) can be integrated into other risk models to assess the risk of catastrophic failure during orbiter operation. FIG. 28 is the ET structure of the hydraulic system which indicates that loss of a single hydraulic system is not catastrophic, however, the loss of two or more hydraulic systems will result in a loss of crew and/or vehicle.

Here, each branch point of the ET is a relatively complicated single hydraulic system, which is represented by a FT structure. For simplicity, the FT structures based on a real example are modified to be used for our analysis, shown in FIG. 29(a)-29(e).

Modularization

Based on the FT structure in Figure B6, we see that there is a shared event as a spare across all three systems, and there also exist dependency relationships due to common causes X, Y and Z. After applying modularization methodology, we get three premodules from each single hydraulic system and then form three branch modules, $M_1\{A_1, A_2, A_3, A, X\}$, $M_2\{B_1; B_2, B_3, Y\}$ and $M_3\{C_1, C_2, C_3, Z\}$. Thus the size of the MC for branch modules efficiently decreases. FIG. 30(A) only list a small part of the MC before modularization, which theoretically contains $2^n$, namely $2^{13}$ states in total. See also FIG. 30(B). Table B1 makes a brief comparison before and after this process. The efficiency is greatly improved.

TABLE B1

A comparison of MC size

| | Before modularization | After modularization | | |
|---|---|---|---|---|
| | | module 1 | module 2 | module 3 |
| # of states | 8192 | 32 | 16 | 16 |

Conclusions from the APU Example of Modularization

Most safety critical systems are composed of many subsystems, with each containing hundreds even thousands of components. These components may have direct or indirect relationships such as sharing with a common power supply, or sharing with a common spare component for different units across several subsystems. Therefore, modularity is very important during the ET analysis process, especially helpful when we combine DFT and ET (e.g., both reducing the overhead to construct MC then solve it and reducing the chance to create the errors). In this application, the modified APU example efficiently proved the improvement on saving state space by modularizing. It should be appreciated that this is only an illustrative an non-limiting two level simplified example. In reality, a real system with multi-level structure should benefit from this process much more.

Additional Examples

Figure 31:
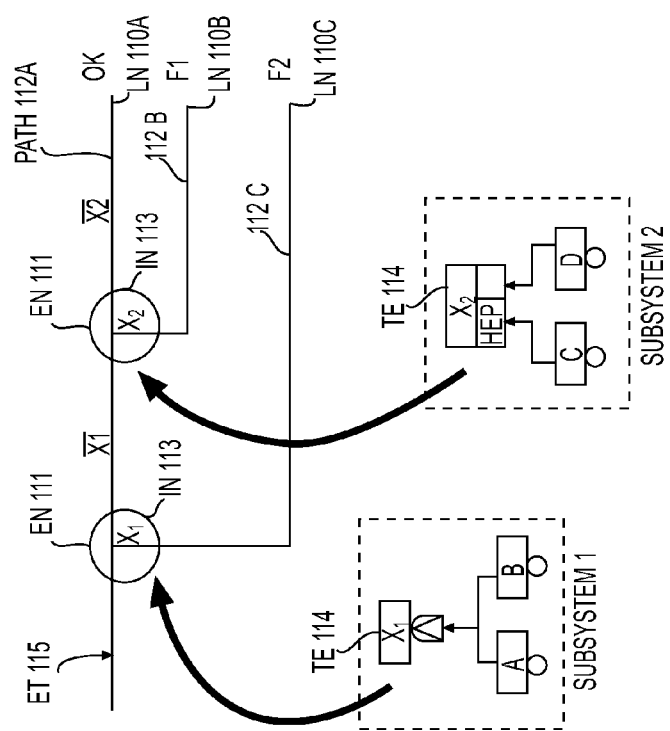
FIG. 31 is a schematic diagram that represents an illustrative and non-limiting method for calculating the Probabilistic Risk Assessment (PRA) of a complex super system.

For illustrative purposes, FIG. 31 shows an illustrative and non-limiting schematic diagram that represents a method for calculating the Probabilistic Risk Assessment (PRA) of a complex super system (an event tree ET 115) consisting of the internal nodes (IN 113) x1 and x2 (in circles), (which are sometimes referred to as event nodes EN 111), the leaf nodes LN110, and their connecting paths (112). The nodes x1 and x2 are also top events (TE 114) of static and dynamic subsystems, static and dynamic to be defined momentarily.

Subsystem 1 consists of events "A" and "B" joint by a PAND gate, and its top (failure) event is the event tree (ET 115) node x1. Subsystem 2 consists of the events "C" and "D" joined by a hot spare gate, and its top (failure) event is event tree node (ET 115) x2. In this case, both subsystems are dynamic, since both gates are dynamic. We can, however, envision the gate of subsystem 1 to be an AND gate. In that case, subsystem 1 would be static, and subsystem 2 would be dynamic. Static gates include AND, OR and N/K. Dynamic gates include FDEP, SP and PAND. Likewise, if we assume that the gate of subsystem 2 is also dynamic, then the event tree would have two static subsystems. If the gate(s) connecting the events of the subsystem are all static, the subsystem is referred to as a Static Fault Tree (SFT). If any of the subsystem's gates are dynamic, it is referred to as a Dynamic Fault Tree (DFT).

The internal nodes (IN113) represent mitigating or aggravating events in the complex super system, and the leaf nodes (LN110) represent system failure, non failure or non-occurring conditions The paths of the ET 115 are traversed as follows:

1) If node x1 is true, then the path 112c labeled X1 (without bar) is taken and the leaf node (LN 110c) at F2 is reached. This path represents a system failure.

2) If node x1 is false and node x2 is true, then the path comprised of X1 (bar), X2 (without bar) and leaf node (LN110b) at F1 is taken. This path also represents a system failure 3) If node x1 is false and node x2 is false, then the path comprised of X1 (bar) X2 (bar) and leaf node (LN110a) at OK is taken. This path represents a non-system failure.

In the case where two or more subsystems are SFTs with no events in common (e.g., it in our tree both subsystems 1 and 2 were static, and events "A", "B", "C" and "D" were distinct events), then the probability of the paths (112a, 112b, 112c)—corresponding to the top events (TE 114) of the SFT subsystems—along the event tree (ET 115) would be calculated using inclusion/exclusion analysis or Binary Decision Diagram analysis (BDD). The same type of analysis would be used in the case of SFTs even if events are in common, such as (A=C or D) or (B=C or D).

In the case where two or more subsystems are DFTs with no events in common (e.g., if, in our tree both subsystems 1 and 2 were static, and events "A", "B", "C" and "D" were distinct events), then the probability of the paths (112a, 112b, 112c)—corresponding to the top events (TE 114) of the DFT subsystems—along the event tree (ET 115) would be calculated using a combination of BDD and Markov Chain analysis.

The case where two or more subsystems are DFTs with events in common (e.g., if in our example both subsystems were dynamic, and (A=C or D) or (B or D), the probability of the path represented by such DFTs would be calculated by ANDing the DFTs. to produce a third DFT, and, after a process of modularization, again applying a combination of BDD and Markov chain analysis.

Preferred Systems

The preferred embodiments of the invention can be implemented on one or more computer(s) and/or one or more network of computer(s), such as a local area network (LAN), a wide area network (WAN), the Internet and/or another network. In various embodiments, one or more server(s), client computer(s), application computer(s) and/or other computer(s) can be utilized to implement one or more aspect of the invention. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. Client computers may contain, in some embodiments, browser software for interacting with the server(s), such as, for example, using hypertext transfer protocol (HTTP) to make requests of the server(s) via the Internet or the like.

In some preferred embodiments, the system utilizes relational databases, such as, e.g., employing a relational database management system (RDBMS) program to create, update and/or administer a relational database. The RDBMS may take Structured Query Language (SQL) statements entered by a user or contained in an application program and create, updates and/or provides access to database(s). Some illustrative RDBMS's include ORACLE's database product line and IBM's DB2 product line. In some illustrative embodiments, one or more client computer can be provided; which can include separate client systems, LAN-based systems, and/or various other client systems. The client computer(s) can include an appropriate operating system, such as, for example, WINDOWS NT or another system. In preferred embodiments, the system is adapted to provide an object based graphical user interface (GUI).

In some preferred embodiments, the system provides a multi-user client server system, such as, e.g., in the embodiment shown in FIG. 32(A). In some preferred embodiments, users are provided with a graphical user interface that is presented to the users via client computers. In some embodiments, the graphical user interface enables the importing and/or exporting of data or information.

FIG. 32(B) shows an illustrative computer 320 that can be used to implement computerized process steps in some embodiments of the invention. In some embodiments, the computer 320 includes a central processing unit (CPU) 322, which can communicate with a set of input/output (I/O) device(s) 324 over a bus 326. The I/O devices 324 can include, for example, a keyboard, mouse, video monitor, printer, and/or other devices.

The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, in some examples, calendar data, event data and/or other data 330. The memory 328 can also store software 338. The software 338 can include a number of modules 340 for implementing the steps of processes. Conventional programming techniques may be used to implement these modules. Memory 328 can also store the above and/or other data file(s).

In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. The medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for calculating Probabilistic Risk Assessment (PRA) of a complex super system through the use of an event tree (ET) having one or more individual paths and whose event nodes are top events of Static Fault Trees (SFT) and Dynamic Fault Trees (DFT), said method comprising:
    calculating the probability of various paths of said event tree (ET) by calculating the probability of various event nodes of the individual paths of said event tree (ET); wherein
    said event tree (ET) is a binary tree;
    said event nodes comprise:
        internal nodes, which represent mitigating or aggravating events in said complex super system, and
        leaf nodes, which represent failure of said complex super system, non-failure of said complex super system, or non-occurring conditions in said complex super system;
    a Static Fault Tree (SFT) is a structured graph of an SFT sub system of events of said complex super system;
    said Static Fault Trees (SFT) top events represent a failure in a component corresponding to an event of said complex super system, and
    said Static Fault Trees (SFT) comprise one or more SFT child events, wherein said SFT child events are sub events of said complex super system and wherein said one or more SFT child events are connected by ordinary Boolean AND, OR and/or N/K gates;
    a Dynamic Fault Tree (DFT) is a structured graph of a DFT sub system of events of said complex super system,
    said Dynamic Fault Trees (DFT) top events represent a failure in a component corresponding to an event of said complex super system, and said Dynamic Fault Trees (DFT) comprise one or more DFT child events, wherein said DFT child events are sub events of said complex super system and wherein said one or more DFT child events are connected by gates comprising:
  Functional Dependency Gates (FDEP gates), wherein said FDEP gates model situations where one component's correct operation is dependent upon the correct operation of some other component,
  Spare Gates (SP gates), wherein said SP gates model cold, warm and hot pooled spares, and
  Priority AND (PAND) gates wherein said PAND gates model ordered ANDing of events;
calculation of the probability of one or more pivot nodes of said complex super system that are top events of SFTs which have no sub events of said complex super system in common comprises inclusion/exclusion probability analysis or Binary Decision Diagram (BDD) analysis; and
calculation of the probability of two or more pivot nodes of said complex super system that are top events of SFTs which have shared sub events of said complex super system comprises ANDING said SFT pivot nodes along the path and applying inclusion/exclusion probability analysis or BDD analysis.

2. The method of claim 1, wherein the calculation of the probability of one or more pivot nodes of said complex super system are top events of DFTS that have no shared sub events of said complex super system is calculated via modularization using a combination of BDD and Markov Chain (MC) analysis.

3. The method of claim 2, wherein in the calculation of the probability of two or more pivot nodes of said complex super system are top events of DFTs that have shared sub events of said complex super system is produced by ANDing the DFTs to produce a third DFT.

4. The method of claim 3, wherein the probability of said third DFT is calculated using a combination of BDD and Markov Chain (MC) analysis.

5. The method of claim 3, wherein for a DFT the negation of a spare gate is the negation of the logical output of the gate;
  the negation of a PAND gate with inputs A and B means that A did not occur, B did not occur or A occurred after B;
  if the PAND is true for simultaneous events, then the negation of the PAND is not; and
  the negation of the DFT constraints, such as FDEP, SEQ (Sequence Enforcing constraint) and CCG (common-cause group) is inconsequential, since none of the constraints has a logical output.

6. A method for performing probabilistic risk assessment as set forth in claim 1, further comprising:
  integrating a Dynamic Fault Tree model into an Event Tree based risk assessment methodology.

7. The method of claim 6, further including providing Dynamic Fault Tree nodes as pivot nodes in the Event Tree based risk assessment methodology.

8. The method of claim 7, further including said method accounting for dependencies between events.

9. The method of claim 8, further including accounting for dependencies including imperfect coverage, functional dependencies and/or shared spaces.

10. The method of claim 6, further including accounting for dynamic systems with shared events using modularization.

11. The method of claim 10, further including analyzing related units within a module and dealing with non-related modules independently.

12. The method of claim 6, further including modularizing a dynamic fault tree for a pivot node and solving the same via a combination of Binary Decision Diagram and Markov models.

13. The method of claim 6, further including when events are shared between dynamic fault trees being used as pivot nodes in an event tree, the dynamic fault trees are combined using logical operations to product a combined dynamic fault tree.

* * * * *